US008185495B2

(12) United States Patent
Clark et al.

(10) Patent No.: US 8,185,495 B2
(45) Date of Patent: May 22, 2012

(54) REPRESENTATION OF QUALITATIVE OBJECT CHANGES IN A KNOWLEDGE BASED FRAMEWORK FOR A MULTI-MASTER SYNCHRONIZATION ENVIRONMENT

(75) Inventors: Michael Ray Clark, Redmond, WA (US); Lev Novik, Bellevue, WA (US); Moe Khosravy, Bellevue, WA (US); Oliver Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 12/024,967

(22) Filed: Feb. 1, 2008

(65) Prior Publication Data

US 2009/0196179 A1 Aug. 6, 2009

(51) Int. Cl.
*G06F 17/30* (2006.01)

(52) U.S. Cl. ...................................... 707/610

(58) Field of Classification Search .......... 707/202–203, 707/609–614, 620
See application file for complete search history.

(56) References Cited

U.S. PATENT DOCUMENTS

| | | | |
|---|---|---|---|
| 6,317,754 B1 | 11/2001 | Peng | |
| 6,401,104 B1 * | 6/2002 | LaRue et al. ........................... 1/1 |
| 6,742,025 B2 * | 5/2004 | Jennery et al. ................. 709/220 |
| 6,928,467 B2 * | 8/2005 | Peng ............................. 709/219 |
| 7,216,289 B2 | 5/2007 | Kagle et al. | |
| 7,290,019 B2 | 10/2007 | Bjorner | |
| 7,565,513 B2 * | 7/2009 | Ahmed et al. ................. 712/222 |
| 7,620,659 B2 * | 11/2009 | Novik et al. ........................... 1/1 |
| 7,653,640 B2 * | 1/2010 | Khosravy et al. ..................... 1/1 |
| 8,090,685 B2 * | 1/2012 | Clark et al. .................... 707/612 |
| 2002/0133508 A1* | 9/2002 | LaRue et al. .................. 707/202 |
| 2002/0143997 A1* | 10/2002 | Huang et al. .................. 709/248 |
| 2003/0093435 A1* | 5/2003 | Bandekar .................. 707/103 R |

(Continued)

FOREIGN PATENT DOCUMENTS

WO 2007072155 A2 6/2007

OTHER PUBLICATIONS

International Search Report and Written Opinion mailed Jul. 22, 2009 for PCT Application U.S. Appl. No. PCT/US2009/030205, 11 pages.

(Continued)

*Primary Examiner* — Sheree Brown

(57) ABSTRACT

The subject disclosure relates to synchronizing among network nodes in a multi-master synchronization environment that extend a knowledge based synchronization framework to include notions of object quality. In one embodiment, additional dimension(s) are placed on a knowledge vector for a given version of an object that represent quality information for the object, which is accounted for during the synchronization process to allow nodes to decide what types of qualities of objects should be conveyed to them as part of the synchronization process. Other embodiments include tombstoning objects to avoid future synchronization with respect to same objects maintained by other nodes in the multi-master synchronization environment. Advantageously, according to the synchronization framework, endpoints can synchronize data in a way that allows a definition and consideration of quality of one or more objects of the synchronized data for purposes of a knowledge exchange.

21 Claims, 18 Drawing Sheets

U.S. PATENT DOCUMENTS

| | | | |
|---|---|---|---|
| 2003/0145020 | A1 | 7/2003 | Ngo et al. |
| 2004/0186916 | A1 | 9/2004 | Bjorner |
| 2005/0027755 | A1* | 2/2005 | Shah et al. ............ 707/201 |
| 2005/0060370 | A1 | 3/2005 | Xue |
| 2005/0262164 | A1 | 11/2005 | Guiheneuf |
| 2006/0161516 | A1 | 7/2006 | Clarke |
| 2006/0190500 | A1 | 8/2006 | Rao et al. |
| 2006/0215569 | A1* | 9/2006 | Khosravy et al. ............ 370/241 |
| 2006/0242443 | A1* | 10/2006 | Talius et al. ............ 713/400 |
| 2006/0277224 | A1* | 12/2006 | Aftab et al. ............ 707/201 |
| 2007/0067349 | A1* | 3/2007 | Jhaveri et al. ............ 707/200 |
| 2007/0088764 | A1* | 4/2007 | Yoon et al. ............ 707/201 |
| 2007/0094471 | A1* | 4/2007 | Shaath et al. ............ 711/163 |
| 2007/0180075 | A1 | 8/2007 | Chasman |
| 2009/0089448 | A1* | 4/2009 | Sze et al. ............ 709/231 |
| 2009/0196311 | A1* | 8/2009 | Khosravy ............ 370/503 |

OTHER PUBLICATIONS

"Norman H. Cohen", "A Java Framework for Mobile Data Synchronization", In Opher Etzion and Peter Scheuermann, eds., Cooperative Information Systems: 7th International Conference, CoopIS 2000; Eilat, Israel, Sep. 2000; Proceedings. http://www.research.ibm.com/sync-msg/CoopIS2000.pdf, 12 pages.

Carlos Quiroz Castro, "Version Vectors Based Synchronization Engine for Mobile Devices", Proceedings of the 25th IASTED International Multi-Conference Parallel and Distributed Computing Networks, Feb. 13-15, 2007, Innsbruck, Austria, http://delivery.acm.org/10.1145/1300000/1295631/p309-castro.pdf?key1=1295631&key2=6188815911&coll=&dl=&CFID=15151515&CFTOKEN=6184618, 6 pages.

* cited by examiner

REPRESENTATION OF QUALITATIVE OBJECT CHANGES IN A KNOWLEDGE BASED FRAMEWORK FOR A MULTI-MASTER SYNCHRONIZATION ENVIRONMENT

TECHNICAL FIELD

The subject disclosure relates to an enhanced metadata for describing knowledge of changes to object(s) being synchronized in a knowledge based synchronization framework for a multi-master synchronization environment, where the enhanced metadata embodies qualitative information about the changes.

BACKGROUND

The popularity of mobile computing and communications devices has created a corresponding wish for the ability to deliver and receive information whenever wanted by users. Put simply, users want ubiquitous access to information and applications from a variety of devices, wherever, whenever, and whatever the devices' respective capabilities, and in addition, users want to be able to access and update such information on the fly, and they want guarantees that the data is as correct and up to date as can be.

There are a variety of distributed data systems that have attempted to have devices and objects share replicas of data with one another. For instance, music sharing systems may synchronize music between a PC, a Cell phone, a gaming console and an MP3 player. Email data may be synchronized among a work server, a client PC, and a portable email device. However, today, to the extent such devices synchronize a set of common information with each other, the synchronization typically takes place according to a static setup among the devices. However, when these devices become disconnected frequently or intermittently, i.e., when they are loosely coupled such that they may become disconnected from communicating with each other, e.g., when a cell phone is in a tunnel, or when the number of devices to be synchronized is dynamic, it becomes desirable to have a topology independent way for the devices to determine what changes each other device needs when they re-connect to one another, or as they join the network.

As shown in FIG. 1, there are various examples today where a master node 100 synchronizes in a dedicated manner with a client node 110, such as when an email server synchronizes with an email client. Due to the dedicated synchronization between the two devices, the information 102 needed to synchronize between the two devices can be tracked by the master node 100. Such information 102 can also optionally be tracked by client node 110 as well, however, when the connection between master node 100 and client node 110 becomes disconnected at times, or when the number of synchronizing devices can suddenly increase or decrease, tracking the necessary information of the common information that each device needs across all of those devices becomes a difficult problem.

Current solutions often base their synchronization semantics solely on clocks or logical watermarks for a specific node (e.g., the email server), as opposed to any node. These systems can work well in cases of a single connecting node or master. However, they run into problems when the topology or pattern in which the nodes connect can change unpredictably.

Other systems build proprietary synchronization models for specific kinds of data objects, tracking an enormous amount of primitive metadata specific to the data format across the devices in order to handle the problem. For instance, to synchronize objects of a particular Word processing document format, a lot of overhead and complexity goes into representing a document and its fundamental primitives as they change over time, and representing that information efficiently to other devices wishing to synchronize according to a common set of Word processing documents. In addition to such systems being expensive and complex to build and non-extendible due to the custom data format upon which they are based, such systems are inherently unscalable due to large amounts of metadata that must be generated, analyzed and tracked.

In addition, such solutions apply only to the one specific domain, e.g., Word processing documents. When synchronization objects of all kinds are considered, e.g., pictures, videos, emails, documents, database stores, etc., one can see that implementing custom synchronization solutions based on each object type for tracking evolution of such objects across all devices in a multi-master environment is unworkable today. Accordingly, such solutions inextricably link synchronization semantics with the data semantics.

Thus, there is a need for node-independent synchronization knowledge when computers in a topology change the way they connect to each other or as the number of computers grows. For instance, with a media player, it might be desirable to synchronize among multiple computers and multiple websites. In most instances, most applications can only synchronize data between a few well-known endpoints (home PC and media player). As the device community evolves over time for a user of the media player application, however, the need for data synchronization flexibility for the music library utilized by the devices increases, thereby creating the need for a more robust system.

The need becomes even more complex when one considers that many computing objects are not monolithic in terms of the types of changes that can happen. In today's complex computing environments, object changes encompass a wide variety of changes beyond mere "add data to the object" or "subtract data from the object." A change to some of the data of the object can also be thought of as subtracting the data to be changed and adding the data reflecting the change. Thus, under the monolithic view, there is a limited view of what can happen to an object in terms of evolution of the object: the data represented by the object can be augmented with some new data, some of the data represented by the object can be changed while the rest stays the same and/or some of the data represented by the object can be deleted.

In this regard, an entire host of properties can also change for an object. For instance, the name of an object, when the object was last viewed, the length allowable for fields of an object, the schema of an object (e.g., contact schema), the fidelity of an object (e.g., audio), the compression scheme applied to an object, the resolution of an object (e.g., images or video), the file format of the object, or any other arbitrary function that can be defined over an object, are all examples of properties that can change for an object that are not adequately reflected by mere representation of adding or subtracting from the data of an object.

In this regard, different devices have different requirements or limitations with respect to representing the same objects. For instance, representing objects on a PC in general implicates different requirements than representing objects on a mobile phone with limited memory. As an example, it is more suitable to represent a 10 Mb raw image on the PC for a given image object, whereas it is more suitable for the mobile phone with the smaller display and memory to represent the same given image object as a 300 Kb image.

Some conventional systems have treated objects that undergo a quality change from a first quality to a second quality as separate objects, i.e., by creating an entirely new second object that reflects the changes undergone by the object to the second quality in addition to maintaining the first object which stays of the first quality. As a result, both objects become synchronized moving forward. One can see that such system becomes prohibitive and highly wasteful if the number of different objects, number of devices and/or the number of versions of different quality becomes non-trivial.

Thus, since objects can change in complex ways, particularly as they are synchronized across different devices of different capabilities, a way to represent such changes efficiently in synchronization metadata and simultaneously handle synchronization in a loosely coupled, multi-master synchronization environment, as described above, is currently desirable. In brief, the ability to represent loss or gain of quality of objects in a knowledge exchange in a complex multi-master network topology of devices as objects undergo changes in quality, if made possible, would be desirable for a myriad of synchronization scenarios.

The above-described deficiencies of today's synchronization models are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments provide synchronization among a plurality of network nodes in a multi-master synchronization environment are described herein that extend a knowledge based synchronization framework to include notions of object quality. Advantageously, according to the synchronization framework, endpoints can synchronize data in a way that allows a definition of quality of one or more objects of the synchronized data for purposes of a knowledge exchange.

In one embodiment, additional dimension(s) are placed on a knowledge vector for a given version of an object that represent incremental quality information for the version of the object, which is accounted for during the synchronization process to allow nodes to decide what types of qualities of objects should be conveyed to them as part of the synchronization process. For instance, objects having qualities that are not desirable to a node can be tombstoned to avoid future synchronization with respect to such objects maintained by other nodes in the multi-master synchronization environment. In other embodiments, where a change to an object is non-destructive (as decided by a node), the current version of the object is enhanced to reflect another version of the current version, i.e., a version representing the quality level of the changed object. If the change is regarded as destructive, the new version is reflected by the synchronization metadata.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
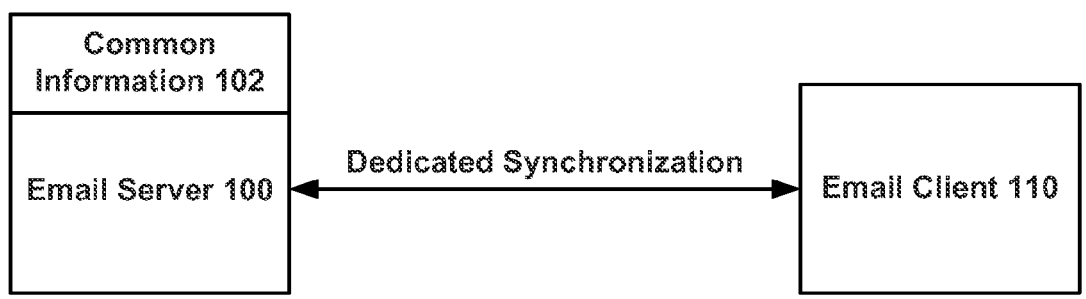
FIG. 1 illustrates a dedicated synchronization system that provides synchronization between two well defined endpoints of the system.

As discussed in the background, among other things, conventional systems create different versions for an object for every change occurring to the object, however, such systems do not capture qualitative information about changes to an object, such as a lossless transform, transcoding, transcription or change in fidelity. For example, it would be desirable to capture information about a change in quality of an object, or particular version of the object, as part of the synchronization language itself so that devices can synchronize only with qualitative versions of objects they desire and not synchronize with objects having qualitative versions rejected by the object.

Accordingly, in various non-limiting embodiments, objects of different fidelity, transforms, encodings, i.e., different qualitative versions, are synchronized in a multimaster synchronization environment in a way that captures intelligence about the qualities of the objects so that different nodes in the multimaster synchronization environment can compare knowledge and determine which objects to synchronize, and which objects are not desirable to synchronize.

As a roadmap for what follows, first, an overview of some of the embodiments described herein is presented. Then, some supplemental context is given for a general mechanism for efficiently representing knowledge in multi-master data synchronization systems. Next, exemplary, non-limiting embodiments and features are discussed in more detail for supplemental context and understanding of alternative embodiments of multi-master data synchronization systems for representing quality information about changes to objects, followed by representative network and computing environments in which such embodiments can be implemented.

In this regard, various embodiments are directed to a data synchronization framework for nodes of a multi-master synchronization environment that defines a model for synchronization based on a concept referred to herein as knowledge. In brief, knowledge is metadata maintained logically separate from the objects being synchronized, which defines an efficient summary of the state based synchronization of a replica, so that devices can first exchange their knowledge and then efficiently enumerate what changes to objects should be passed to one another. Advantageously, each node can define its own rules as to what qualities for objects that are desirable to synchronize, and which qualities for objects are undesirable to synchronize. For instance, a device can specify a test for determining what versions are desirable, or stack rank different qualities in an order of preference.

In this regard, in many cases it is useful to synchronize data in a way that efficiently represents what each device of a multi-master synchronization topology knows about a quality level of an object being synchronized (e.g., low definition v. high definition), or more generally, what each device knows about any transformation or transformations applied to an object being maintained by the device. In this respect, a device can communicate such information efficiently as part of a knowledge exchange so that the individual endpoints can decide whether to synchronize with a lesser quality object (or first transform of an object) or seek out a device having the object with higher quality (or second more suitable transform of the object).

In one embodiment, whenever an endpoint receives a version of unacceptable transform, encoding, fidelity, etc., the endpoint can tombstone the unacceptable object version, in effect deleting the item from synchronization processes, while the endpoint maintains the metadata about the unacceptable version so that future synchronization avoids accepting the unacceptable version again. However, over time, it is possible that such tombstone metadata will proliferate unacceptably. In short, a device does not really need to maintain a record of everything it ever interacted with that it did not like, especially for devices of limited functionality, which presumably will reject a lot.

In other embodiments employing an efficient representation of this type of knowledge, achieving sharing of quality information among nodes is accomplished by versioning versions of data. Such embodiments can also be extended to any number of levels or layers of transforms or quality levels that are applied to an object by versioning versions of versions for two layers, versioning versions of versions of versions for three layers, and so on. Individual endpoints are allowed to decide whether a particular change to an object represents a typical change that does not necessitate versioning of versions (a usual increment to the tickcount, or apply a new version), or represents instead a fidelity or transform change, which is represented by versioning the version represented by the current tickcount.

The ability to efficiently capture and represent information about what objects have changed via versions plus the ability to capture and represent information about how those objects have transformed, in effect tells an endpoint how useful a particular version of an object will be to the endpoint. Enhancing knowledge by including versioning of version information in a knowledge representation is thus another way to accomplish the objective of conveying qualitative information about transformations to objects.

As mentioned, a tombstoning embodiment can also be implemented such that when an object receives an item it does not want (e.g., the resolution is too high for the memory of the device), the device can tombstone the item so that it does not receive the item again, but can convey knowledge that it learned of the item, but deleted the item. Thus, various embodiments incorporate the notion of quality of transformations or transcoding of objects into the language of synchronization itself, so that information about differing qualities of objects is defined as part of synchronization knowledge.

Figure 2:
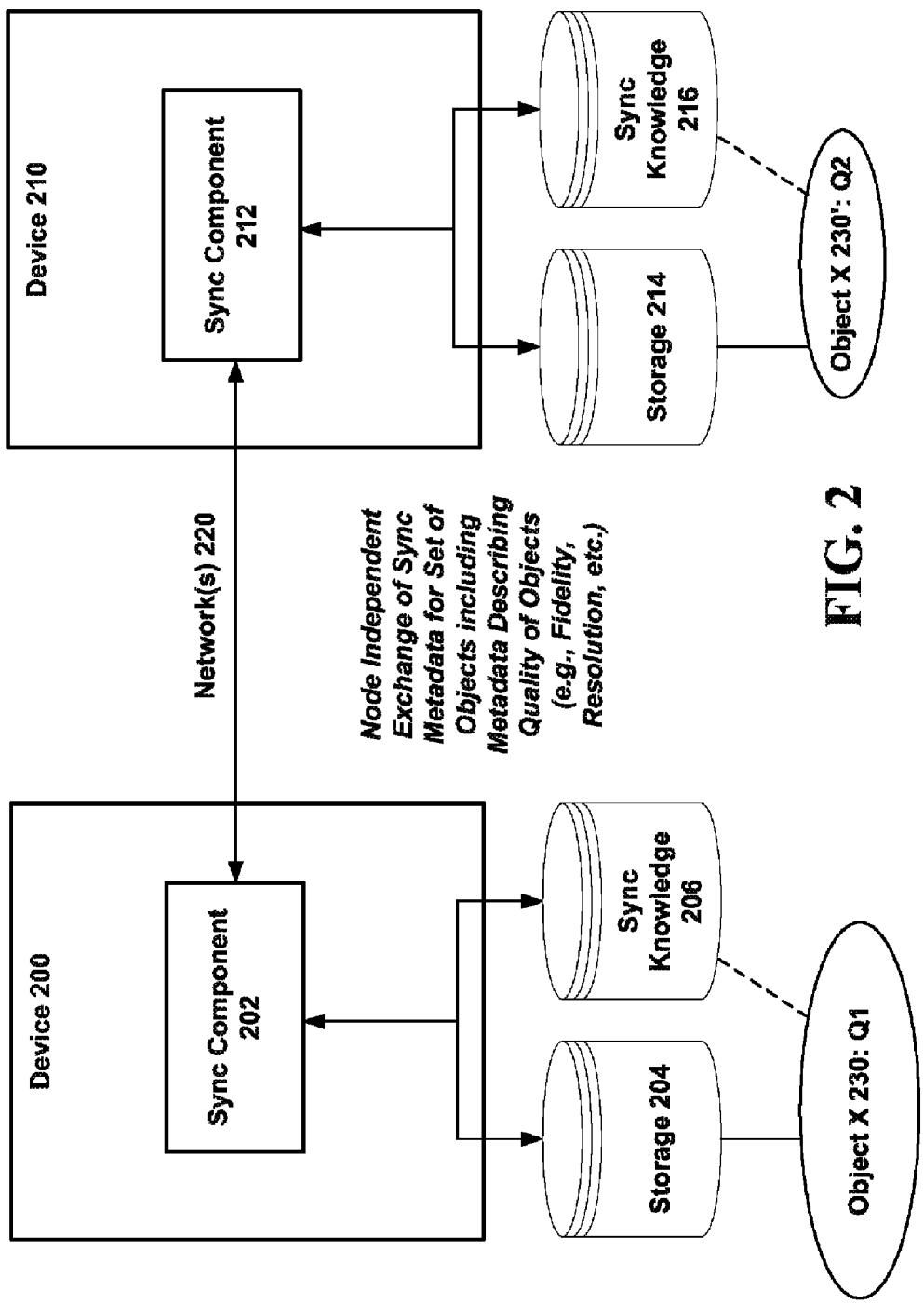
FIG. 2 illustrates a high level block diagram of an infrastructure for multi-master synchronization that incorporates synchronization metadata including quality information for synchronized objects.

FIG. 2 is a block diagram generally illustrating the concept of objects that synchronize in a multi-master synchronization environment where the objects are of different qualities according to synchronization metadata defined for the objects. As shown, a device 200 and a device 210 are shown synchronizing, having connected to one another via network(s) 220, via synchronization components 202, 212, respectively. Each sync component 202, 212 stores objects in storage 204, 214 as well as maintains synchronization knowledge 206, 216, respectively, of those objects as described in more detail below. In this regard, the synchronization knowledge 206, 216 used for synchronizing independent of data type and network topology can be augmented to include metadata describing quality of objects.

In the case of metadata describing the quality of an object, this means that qualitative information about different transformations of an object can be captured for synchronization of objects. For instance, as illustrated, the same object X might be represented on device 200 and device 210 represented as object 230 and 230', respectively. Object 230 has a quality Q1 and object 230' has a quality Q2, different from quality Q1. In accordance with the multi-master synchronization protocol based on knowledge described in connection with various embodiments, synchronization knowledge 206, 216 thus includes information, in addition to versioning of changes to objects, which describes different qualities of the same version of an object.

For instance, object X 230 might be a song of WMA format whereas object X 230' might be the same song, but encoded as AAC format. Instead of representing both objects as different versions of the song, various embodiments herein enable a knowledge representation that indicates that it is the same version, but there are differing qualities associated with the version. Thus, nodes can decide based on quality information embodied in synchronization metadata, whether or not a given quality version should be synchronized.

While a song was used an example, the type of object is not pertinent. The same techniques can be applied any time it is useful to declare that a version of an object can thought of as having differing qualitative characteristics. For instance, a contact item in Outlook on a PC may include many more fields than a contact item on a mobile phone. The former could be considered by a node to be a higher quality version of the contact than the latter. In such case, in essence, it is a change of fidelity or resolution of the amount of data represented by the contact item. Thus, virtually any item can be separated into changes that implicate a transform of the same object e.g., different encodings or different programming language transcodings of the same program, etc. Thus, while some of the embodiments herein have been described in the context of audio or video for conceptual simplicity, any type of object can be considered to undergo a quality transformation, and each endpoint can define what that means in terms of synchronization for its goals.

Figure 3:
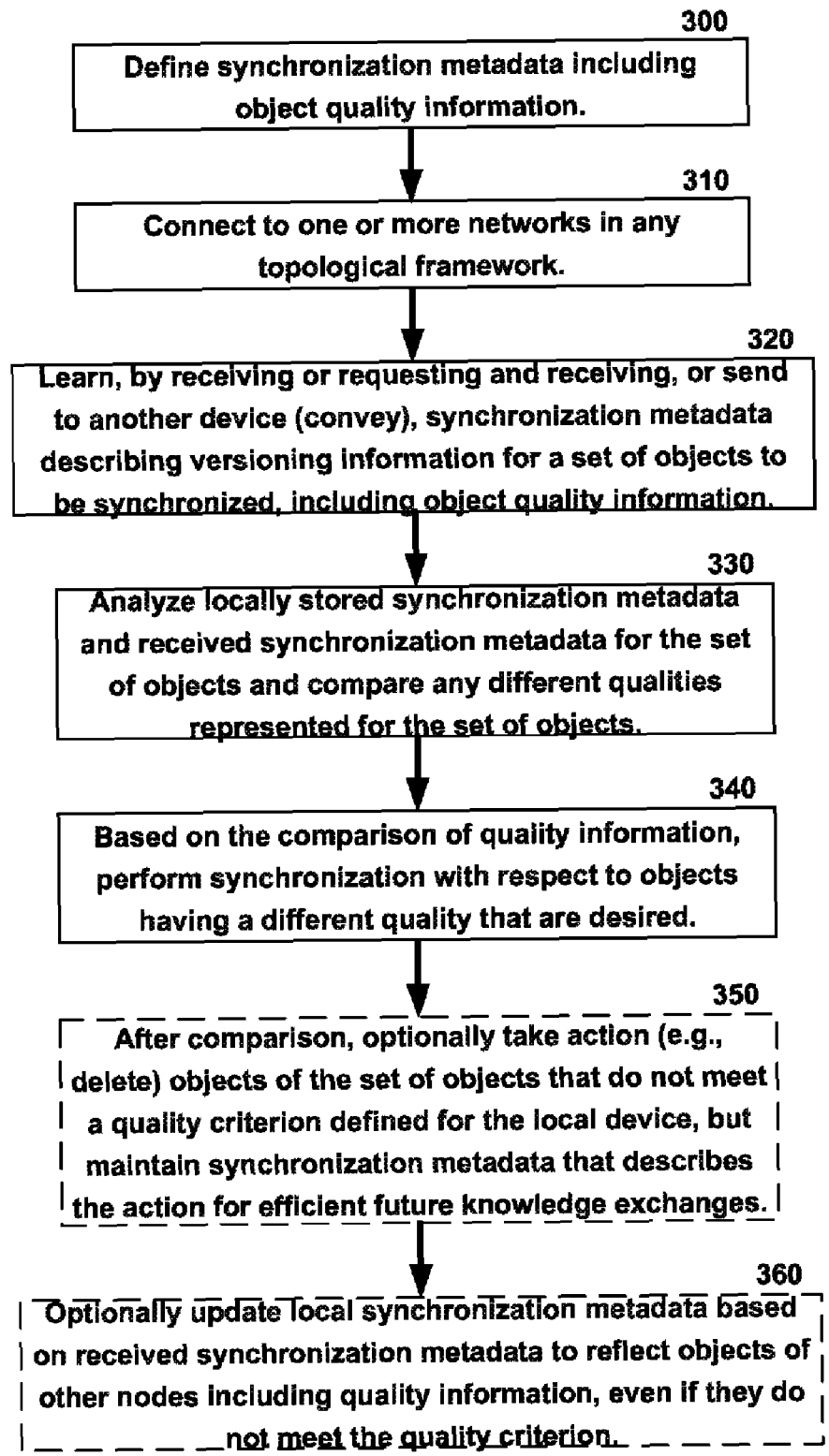
FIG. 3 is a flow diagram illustrating an exemplary, non-limiting process for synchronizing based on quality synchronization metadata in the presence of nodes that connect and disconnect from a network.

FIG. 3 is a general flow diagram describing the use of "quality" information for an object for purposes of synchronizing in a multi-master synchronization environment among various nodes. At 300, at some point, synchronization metadata is defined for a version of an object to have different qualities. At 310, a node connects to another node via one or more networks arranged according to any network topology in a multi-master synchronization environment. At 320, the node can learn synchronization metadata, i.e., by receiving, or requesting and receiving from another node, or the node can send synchronization metadata to another node where the metadata describes versioning information for the set of objects to be synchronized and includes quality information about qualitative characteristics of transformations applied to the objects.

At 330, the synchronization metadata of the two nodes including the qualitative information is compared to determine collective knowledge of quality information for the objects. At 340, based on the collective knowledge of quality information for the set of objects, the node can select which objects are to be synchronized. At 350, after the comparison, optionally a node can take action (e.g., delete) objects of the set of objects that do not meet a quality criterion defined for the node, but also maintain synchronization metadata that describes the action taken for efficient future knowledge exchanges with other nodes.

For example, a node can choose to keep only the highest quality version of an object. For images, for instance, if the object has a 5 Mb version, then a 300 Kb version can be deleted as lower resolution assuming support for both versions on the node. For another node, 300 Kb might be the highest resolution supported by the node, and so the node can define to reject quality versions of an object that are higher than 300 Kb. Similarly, different encodings of the same data may apply differently at different nodes in terms of compatibility, and thus advantageously, inclusion of quality metadata in the synchronization metadata improves the vision each node can have about the different kinds of objects that can be obtained, and at the same time, enables a mechanism for nodes to express what quality versions are undesirable.

At 360, optionally, some objects that have been deleted according to step 350 can be tombstoned in the synchronization metadata indicating that the object has been deleted on the local device, that the node has learned of the item having that quality in the past, but that the node does not wish to learn again of the item in the future. In one embodiment, the node in effect lies about having the item by maintaining the information about the item having the rejected quality, but also signaling the item is not wanted in the future. For instance, a Boolean flag can be set for such objects indicating that the object was previously learned and rejected for purposes of comparisons of synchronization knowledge during future knowledge exchanges.

Figure 4:
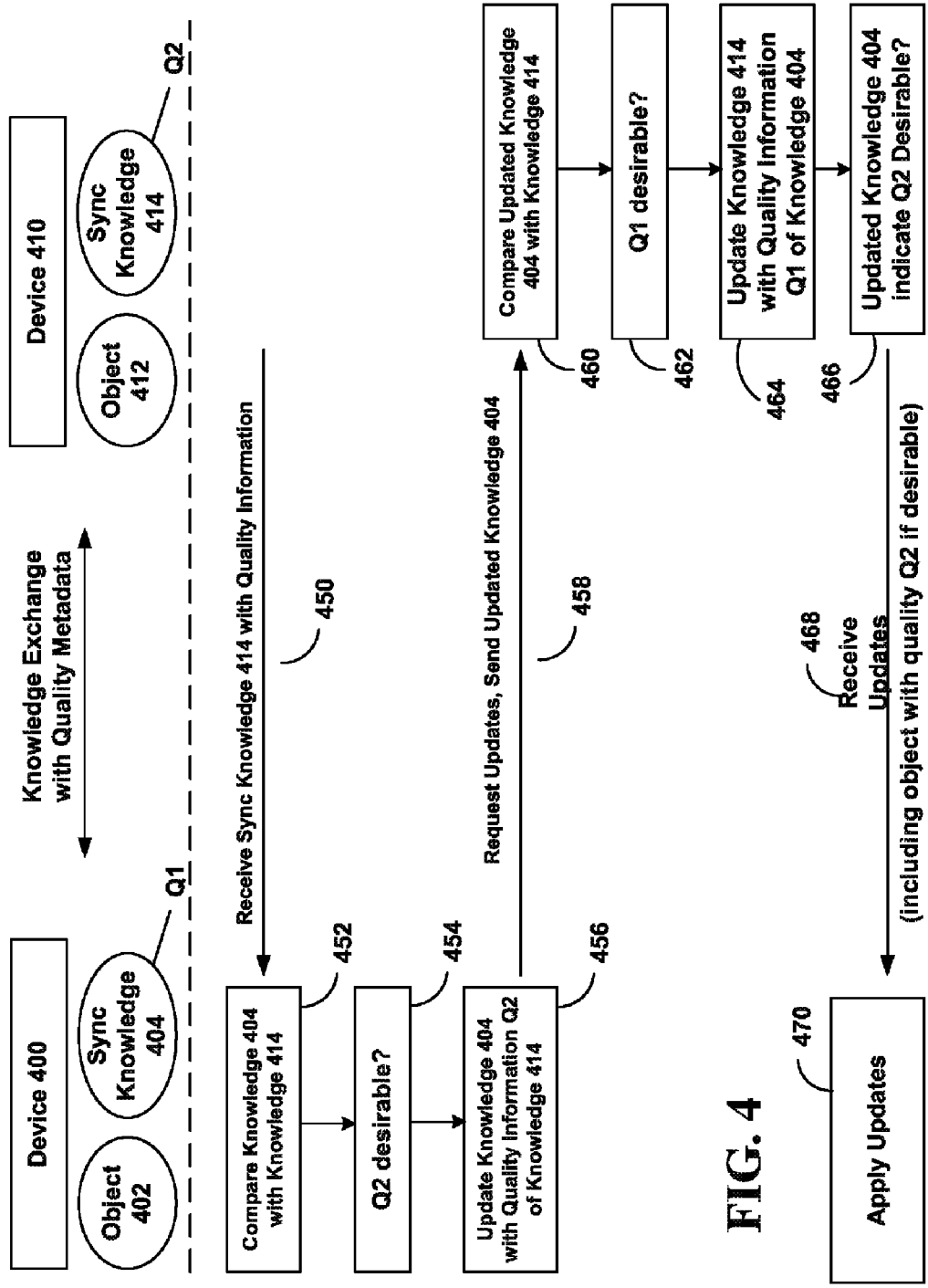
FIG. 4 is another flow diagram illustrating an exemplary, non-limiting process for synchronizing based on quality synchronization metadata.

FIG. 4 is a flow chart illustration showing a representative implementation of the quality information in synchronization metadata in a knowledge exchange framework for synchronizing in a multi-master environment. As shown, a device 300 and a device 410 connect and wish to synchronize. For simplicity of example, FIG. 4 shows one object 402, 412 being synchronized between the devices 400 and 410, respectively, but the techniques can be extended for any set of objects. As mentioned, in accordance with embodiments described herein, synchronization knowledge 404 and 414 is maintained for object 402 and 412 by device 400 and 410, respectively. In this regard, synchronization knowledge 404 represents that quality Q1 applies to object 402 and synchronization knowledge 414 represents that quality Q2 applies to object 412.

As shown at 450, after a node connects to other node via one or more networks arranged according to any network topology in a multi-master synchronization environment, device 410 may receive synchronization knowledge 414 from device 410. At 452, device 400 compares the knowledge 404 with knowledge 414 according to knowledge exchange principles described in more detail below.

In this regard, at 454, device 400 can decide if the version Q2 represented in synchronization knowledge 414 is desirable. If so, local knowledge 404 is updated with the quality information Q2 of knowledge 414 at 456. Next, at 458, device 400, requests the updates for objects of interest to device 400 and the updated knowledge 404 is sent to device 410. Device 410 in turn compares updated knowledge 404 with knowledge 414 at 460 and decides whether the version of device 400 having quality Q1 is desirable at 462. The knowledge 414 is updated at 464 to include the updated knowledge 414 to complete the knowledge exchange. At 466, if the updated knowledge 404 indicates that Q2 is desirable to device 400, then device 400 receives such updates at 468, which are stored by device 400 at 470. Similarly, device 410 receives the changes it wants from device 400. In this fashion, a synchronization knowledge exchange enables devices to be choosy about the quality of the versions it receives during synchronization.

Efficient Knowledge Representation and Exchange

As a prelude to describing the representation of the quality of objects via synchronization metadata represented as knowledge in a multi-master synchronization environment in accordance with various non-limiting embodiments, in this section, an overview is presented of a general mechanism for efficiently representing knowledge in a data synchronization framework.

The general synchronization mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information needed to reconstruct what each other knows and does not know to facilitate of changes between the devices. It is noted that where more than two devices are involved, knowledge may be incomplete with respect to knowledge of a greater base of information to be shared, but as more knowledge is shared around the multiple devices, collective knowledge continues to be accrued by the devices as they connect to the other devices over time.

Advantageously, in various non-limiting embodiments, synchronization is performed for a set of devices, or a subset of devices, all interested in maintaining the latest versions of a set of objects, but also allows such devices to make qualitative conclusions about the different objects to which the devices may synchronize in the computing ecosystem. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 5:
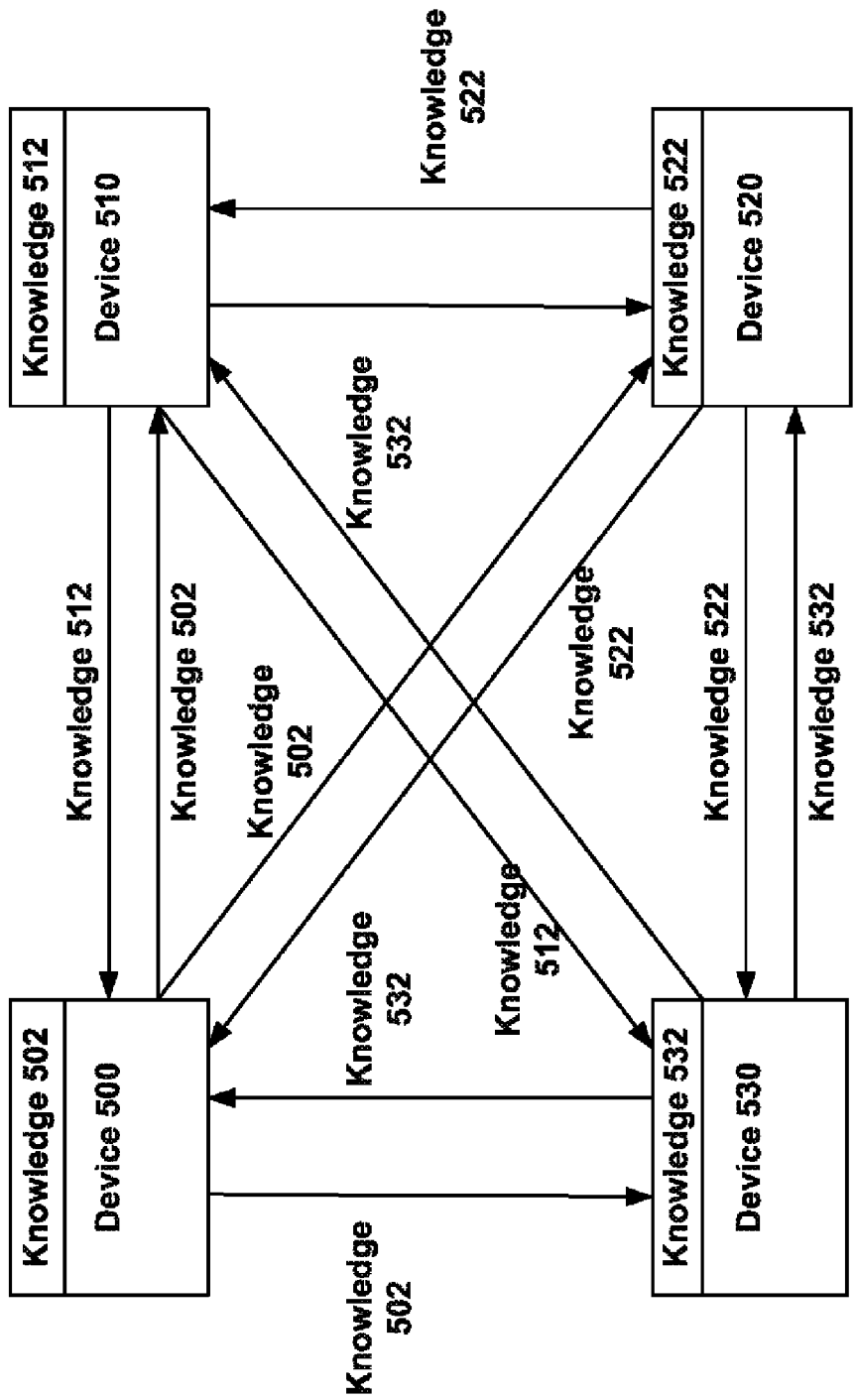
FIG. 5 illustrates exemplary non-limiting knowledge exchange between four nodes of a loosely connected network of nodes.

FIG. 5 illustrates that knowledge exchanges are generalizable, or scalable, to any number of devices. As shown, as a non-limiting number of devices, four devices 500, 510, 520 and 530 are shown with knowledge representations 502, 512, 522 and 532 that respectively indicate what each device knows and does not know about a set of common information to be shared across the devices.

Figure 6:
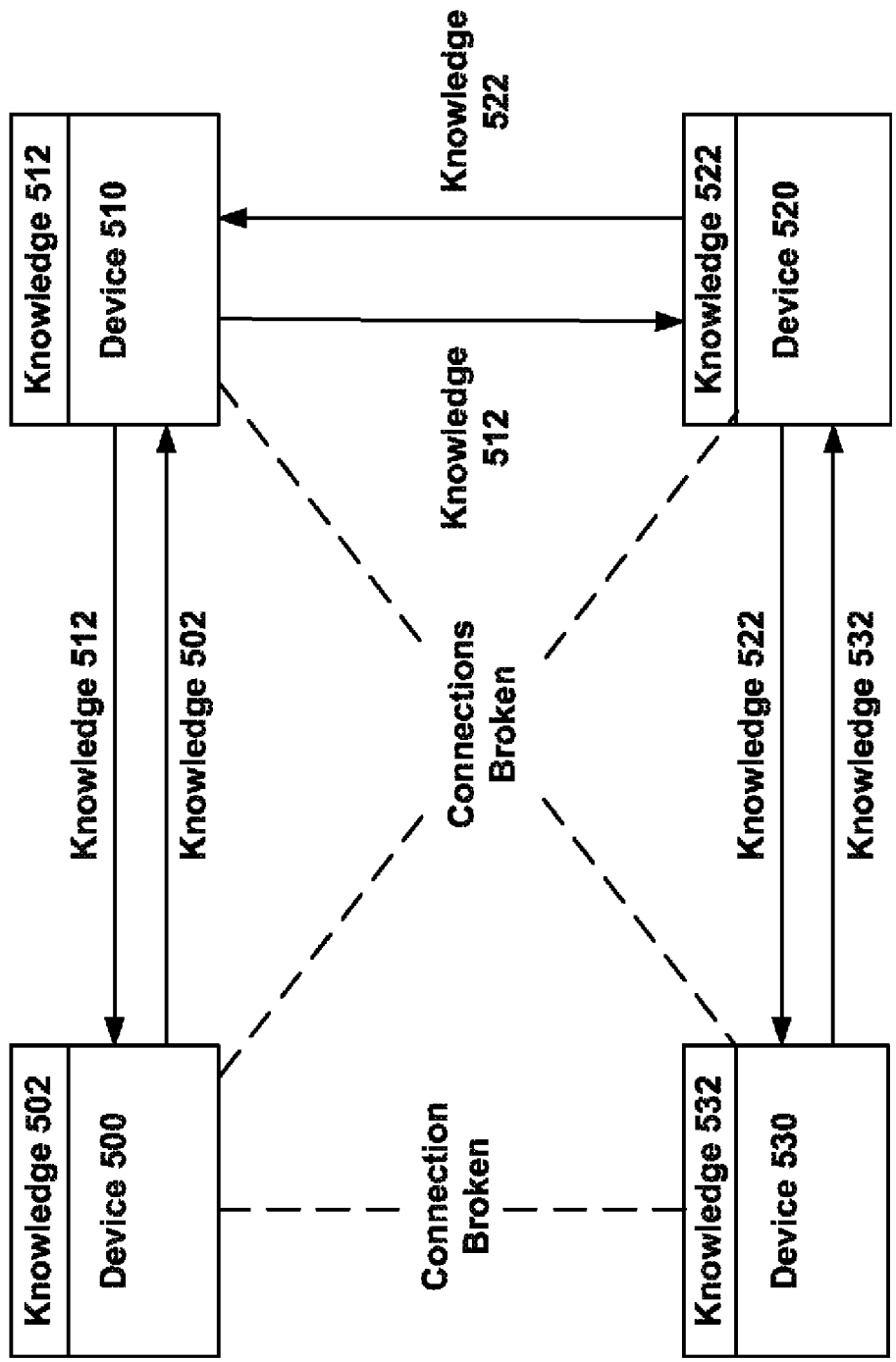
FIG. 6 illustrates exemplary non-limiting knowledge exchange between four nodes of a loosely connected network of nodes when some of the devices become disconnected from one another.

Advantageously, as shown by FIG. 6, even where connections in the network become disconnected, a complete set of knowledge can nonetheless be gained by all of the devices 500, 510, 520, and 530, as long as at least one connection directly or indirectly exists to the other devices. For instance, as shown, knowledge 532 of device 530 still reaches device 500 via the knowledge exchange with device 520, then via the knowledge exchange between device 520 and 510, and finally via the knowledge exchange between device 510 and 500.

With more devices sharing knowledge about common information to be shared, all of the devices benefit because knowledge exchange(s) in accordance with various non-limiting embodiments are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network/multi-master environment.

Figure 7:
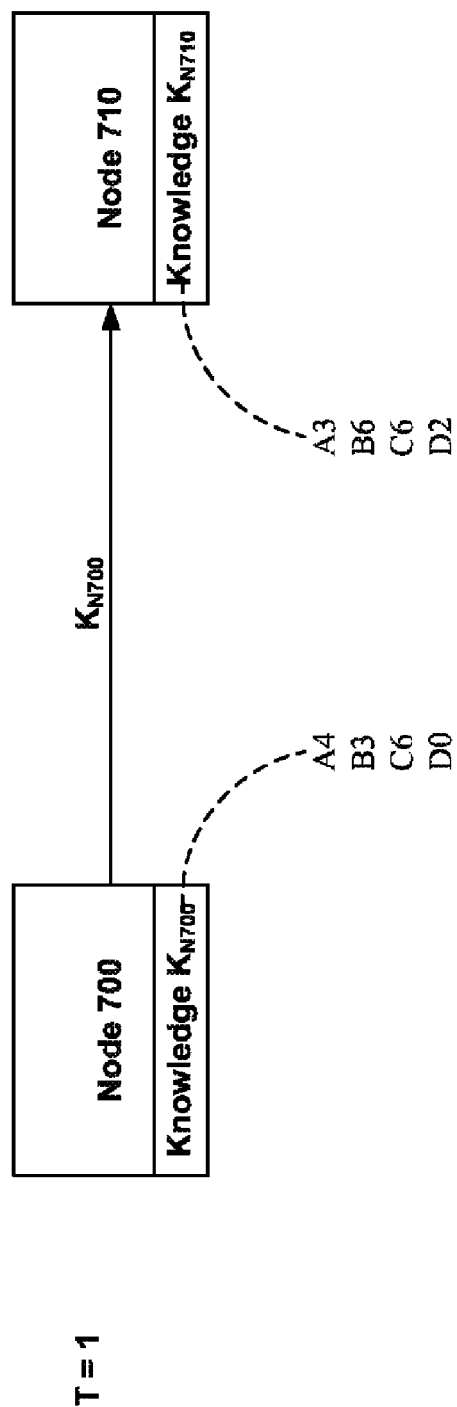
FIGS. 7, 8 and 9 illustrate exemplary knowledge exchange in the context of multiple objects shared among nodes of a network.

Thus, as shown in FIG. 7, node 700 of a peer-to-peer network having any number of nodes wants to exchange data with Node 710. Node A begins by requesting changes from Node 710 and in order to do so Node 700 sends its knowledge (represented as $K_{N700}$) to Node 710 as shown.

Knowledge of a device or node is represented by labeling each object to be shared among devices with a letter identifier, and then the trailing number represents the latest version for this object. For instance, $K_{N700}$ as shown in FIG. 7 includes objects A, B, C and D each to be synchronized between nodes 700 and 710, and the number following each of the objects represents the latest version of the object known on the device. For instance, knowledge $K_{N700}$ at a time t=1 includes the $5^{th}$ version of A, the $4^{th}$ version of B, the $7^{th}$ version of C, and the $1^{st}$ version of D, notated as A4, B3, C6, D0 in FIG. 7. In contrast, knowledge $K_{N710}$ of node 710 at a time t=1 may include the $4^{th}$ version of A, the $7^{th}$ version of B, the $7^{th}$ version of C, and the $3^{rd}$ version of D, notated as A3, B6, C6, D2 in FIG. 7.

Figure 8:
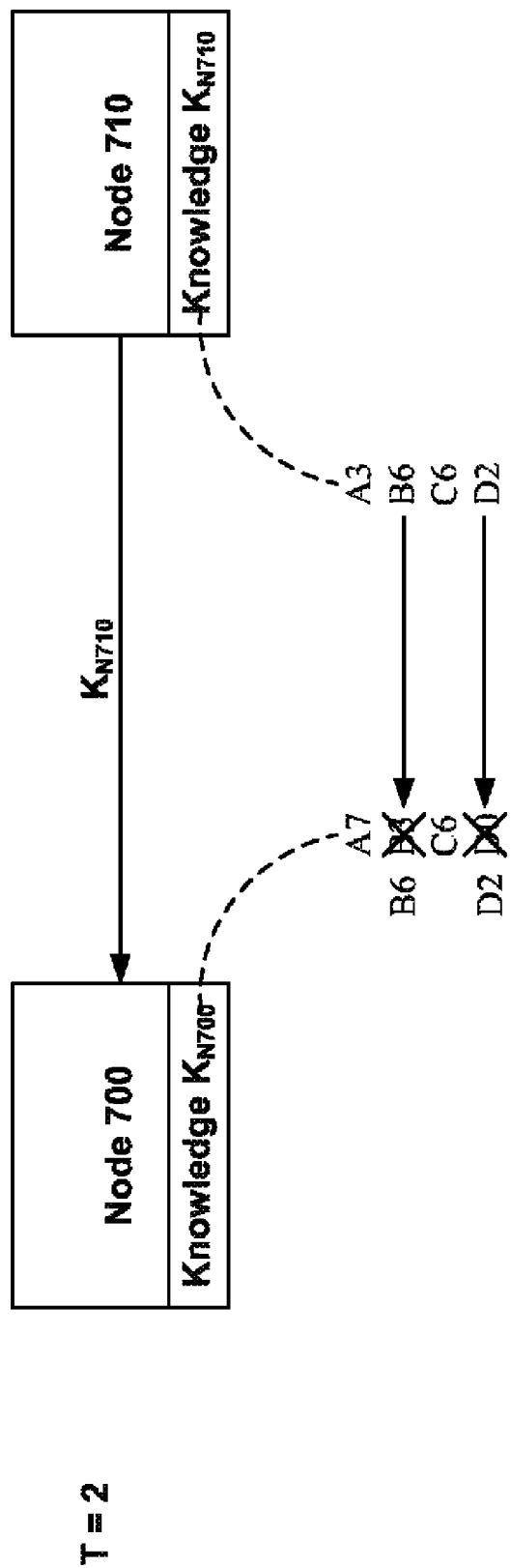

As shown in FIG. 8, at time T=2, node 710 compares knowledge $K_{N700}$ received from node 700 against its own knowledge $K_{N710}$ and determines what needs to be sent to node 700. In this example, as a result, node 710 will send node 700 the changes relating to B and D since node 700's knowledge of B3, D0 is behind node 710's knowledge of B6 and D2. When node 710 sends node 700 the changes between B6 and B3, and the changes between D2 and D0, it also sends along the latest version of knowledge $K_{N710}$ it has (reflecting whenever the last change on node 710 was made).

Figure 9:
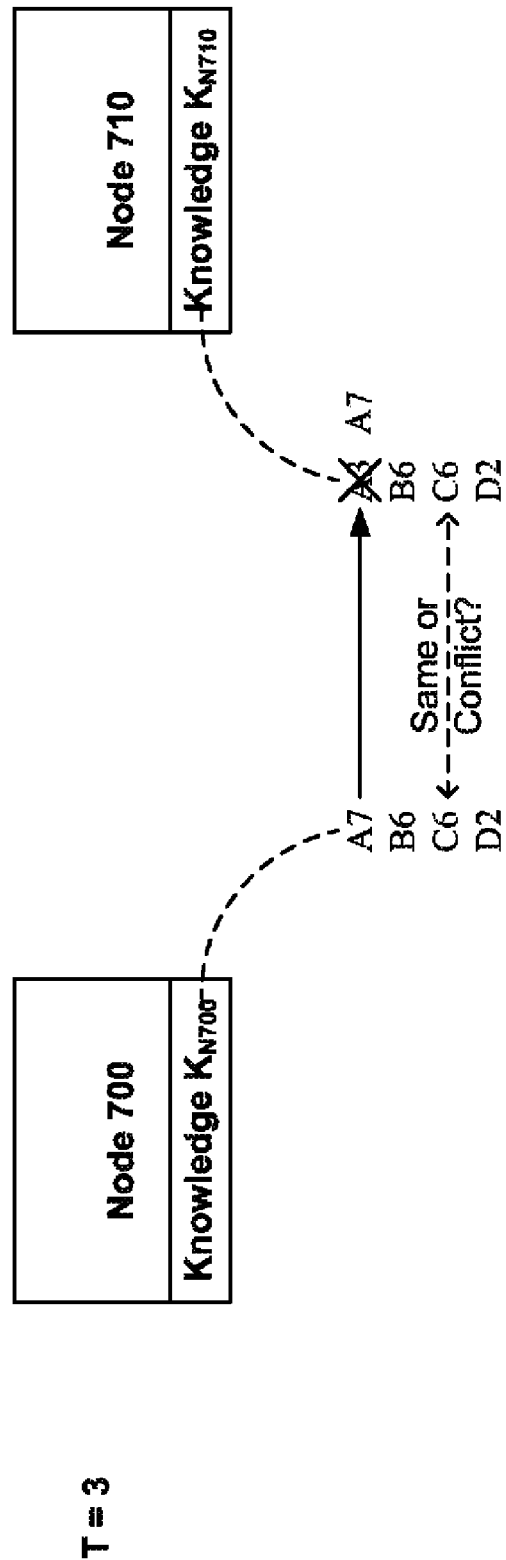

As shown in FIG. 9, representing time t=3, sending knowledge $K_{N710}$ to node 700 allows node 700 to detect conflicts (e.g., store them for later resolution) if it later finds out that both node 700 and node 710 made a change to an object while they were on the same version. This allows for autonomous updating, efficient enumeration, but also correct conflict detection when the nodes meet and exchange changes. For instance, in the example, if C6 is not the same object in both knowledge $K_{N710}$ and $K_{N710}$, e.g., if both independently evolved from C5 to C6, then which C6 is the correct C6 can be set aside for conflict resolution, e.g., according to pre-set policy resolution that befits the synchronization scenario and devices involved.

Figure 10:
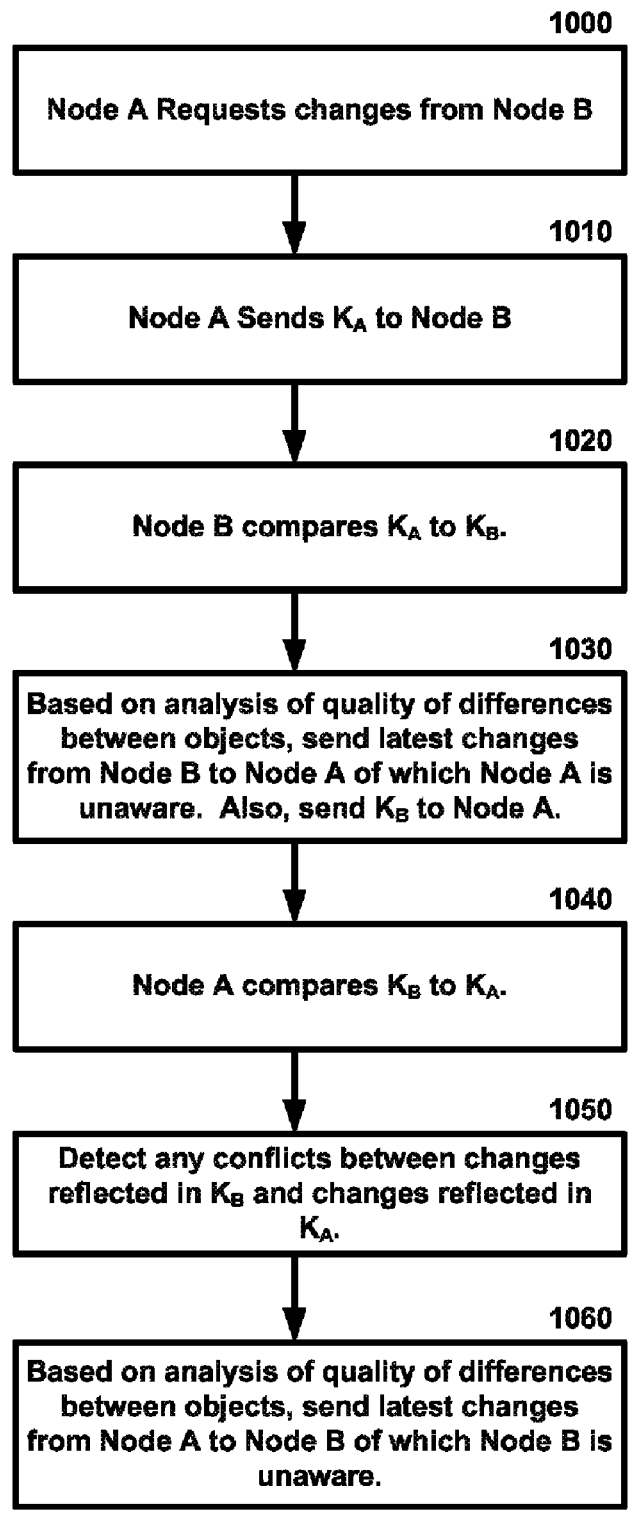
FIG. 10 is an exemplary non-limiting flow diagram illustrating the process for knowledge exchange in the context of multiple objects shared among nodes of a network.

An exemplary knowledge exchange process between any two nodes of a distributed multi-master synchronization environment using the above described general mechanism is shown in the flow diagram of FIG. 10. At 1000, node A requests synchronization with node B, thereby asking node B for changes node A does not know about. In order to equip node B, at 1010, node A sends its knowledge to node B. At 1020, node B compares the knowledge received from node A with its own knowledge to determine what changes node B knows about that should be sent to node A. At 1030, node B sends such changes to node A, and in addition, node B sends its knowledge to node A so that node A can perform a similar knowledge comparison at 1040. Consistent with embodiments described herein, objects having qualitative characteristics according to the metadata that are not desirable for a device are not synchronized, either due to limitations of the device or because such qualitative characteristics do not help the device further a goal.

At 1050, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 1060, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option. Consistent with embodiments described herein, objects having qualitative characteristics according to the metadata that are not desirable for a device are not synchronized, either due to limitations of the device or because such qualitative characteristics do not help the device further a goal.

Figure 11:
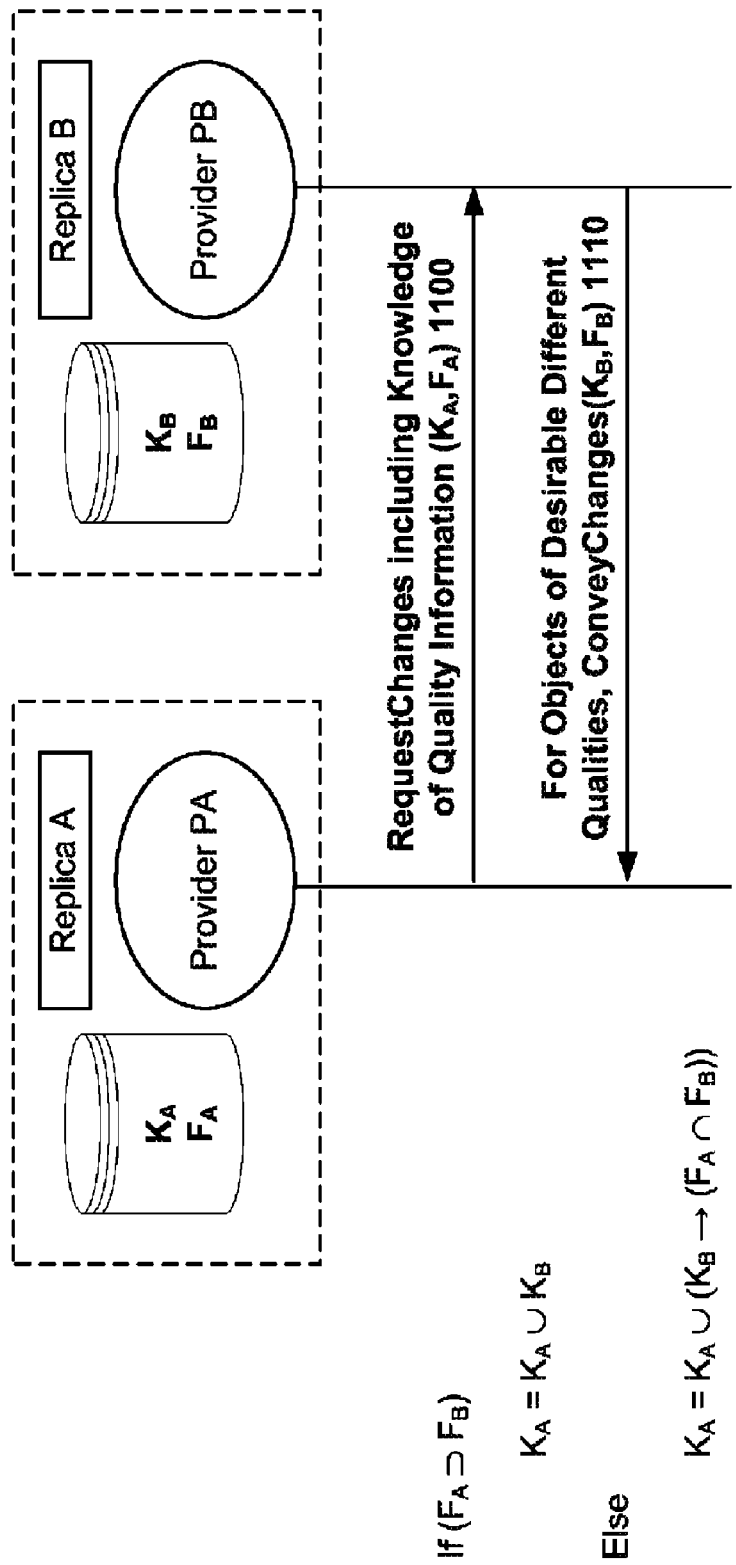
FIG. 11 is a general architecture illustrating the framework for requesting and conveying changes based on knowledge.

FIG. 11 illustrates the generalized mechanism for exchanging knowledge when filtered knowledge is possible, i.e., where a subset of a node's knowledge is to be synchronized with one or more of the other nodes. As shown, each replica A and B has a synchronization provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 1100 of another replica and receive changes 1110 in response to the other replica conveying changes. As illustrated, replica A can request changes for a set of objects of a given scope at 1100, sending its knowledge including information about the qualities of the objects of the set. Similarly, at 1110, based on an analysis of the knowledge $K_A$ and $K_B$, at 1110, the changes that replica B knows, but replica A does not know about, are sent to replica A for the objects that are within their quality. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cap F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter.

Filters are one way to control what information is synchronized between devices, but filters do not generally handle characterization of qualities of items as part of the synchronization metadata as provided in implementations described in more detail below.

Accordingly, the notion of knowledge can be used to efficiently represent data for knowledge exchanges among multiple nodes of a multi-master synchronization network, any node of which may independently evolve common information, or subsets of common information, to be synchronized across the nodes. The above-described knowledge based framework can be implemented for a multi-master synchronization environment and as described in more detail below, the framework is extendible to incorporate the notions of quality of versions of objects via efficient synchronization metadata.

Knowledge Based Representation of Quality of Objects

In various embodiments, efficient synchronization of data by devices in a multi-master synchronization topology is provided where devices know about a quality level of an object being synchronized (e.g., first audio format v. second audio format, or a first resolution v. a second resolution, or adhering to a first schema or adhering to a second schema), or more generally, where each device knows about any transformation or transformations applied to a version of an object. Devices can communicate such information efficiently as part of a knowledge exchange so that the individual endpoints can decide whether to synchronize with a version of an object of a first quality (or first transform of the version of the object) or seek out a device having the version of the object with a different quality (or second more suitable transform of the version of the object).

The ability to efficiently capture and represent information about what objects have changed via versions plus the ability to capture and represent information about how those objects have transformed in a qualitative manner, in effect tells an endpoint how useful a particular version of an object will be to the endpoint—more information is available than the mere fact that the object "has changed" or "is different."

For instance, an iPod cannot consume all kinds of audio files, and is best suited to playing its own proprietary format for audio files. In contrast, most other MP3 players cannot play the iPod proprietary format for the audio files. Thus, as part of the synchronization language itself, it would be desirable to let devices decide whether different qualitative versions of the same object, such as different audio file encodings, are desirable to synchronize as part of a knowledge exchange.

In a first set of embodiments, tombstoning is implemented whereby when an object receives an item it does not want (e.g., the resolution is too high for the memory of the device, or the version of the object adheres to a different schema not supported by the device, or the device cannot decode the encoding, etc.), the device can tombstone the item so that its synchronization metadata reflects that the device does not want to receive the item again. Whenever an endpoint receives a version of unacceptable transform, encoding, fidelity, etc., the endpoint can tombstone the unacceptable object version, in effect deleting the item from synchronization processes with that device.

The item can be deleted by the device too since it is not wanted, or other appropriate action can be taken on the object. An example of another appropriate action might be if the version of the object is of inappropriate encoding for the device, but the device has no decoder for the version of the object, the device might nonetheless have a transcoder which transcodes the inappropriate encoding to an understandable encoding for the device. In such case, rather than delete the object, the device might transform the object to another encoding, and represent the transformation, or new quality level in the synchronization metadata.

In this regard, the endpoint continues to maintain the metadata about the unacceptable version so that future synchronization avoids accepting the unacceptable version again. However, over time, it is possible that such tombstone metadata will proliferate unacceptably. In short, maintaining a record of everything a device ever interacted with that it did not like is not efficient, especially for devices of limited functionality, which reject a lot of objects, or for objects of qualities that will be encountered rarely.

However, for certain computing synchronization ecosystems, such set of embodiments may work extremely well, e.g., in a synchronization environment where devices are generally compatible, have similar applications and similar memory and processing capabilities, few rejections are likely to result since it is likely that each of the devices will want to know everything the others devices know. As the devices become more disparate in hardware and/or software character, it becomes more likely that the devices will not want to know everything the other devices know about. The situation is analogous to people speaking different languages. Much rejection of communications will occur among people speaking different languages to one another until a person begins speaking a language that the other person can understand.

In this respect, the notion of quality of versions of objects can be extended to the devices that are the source of the objects themselves. For instance, over time, a device may learn that most or all of the communications from a particular node are of low or incompatible quality and thus are rejected a lot. In such case, the device may over time choose to not synchronize with another device of low quality, and wait for a higher quality device that has more relevant knowledge for the device. For instance, an MP3 player may choose not to synchronize with an iPod after learning the iPod only has songs of the iPod proprietary format, saving the device from having to perform a knowledge exchange and comparison with the iPod in the future.

As mentioned, one way to represent quality information about versions of object is to tombstone objects as devices become aware of and reject versions of objects that are not suited to the devices. Where a lot of rejection occurs, the amount of information that is stored on a per device basis about what each device does not want to receive in the future can present issues as the number of objects increases dramatically.

Figure 12:
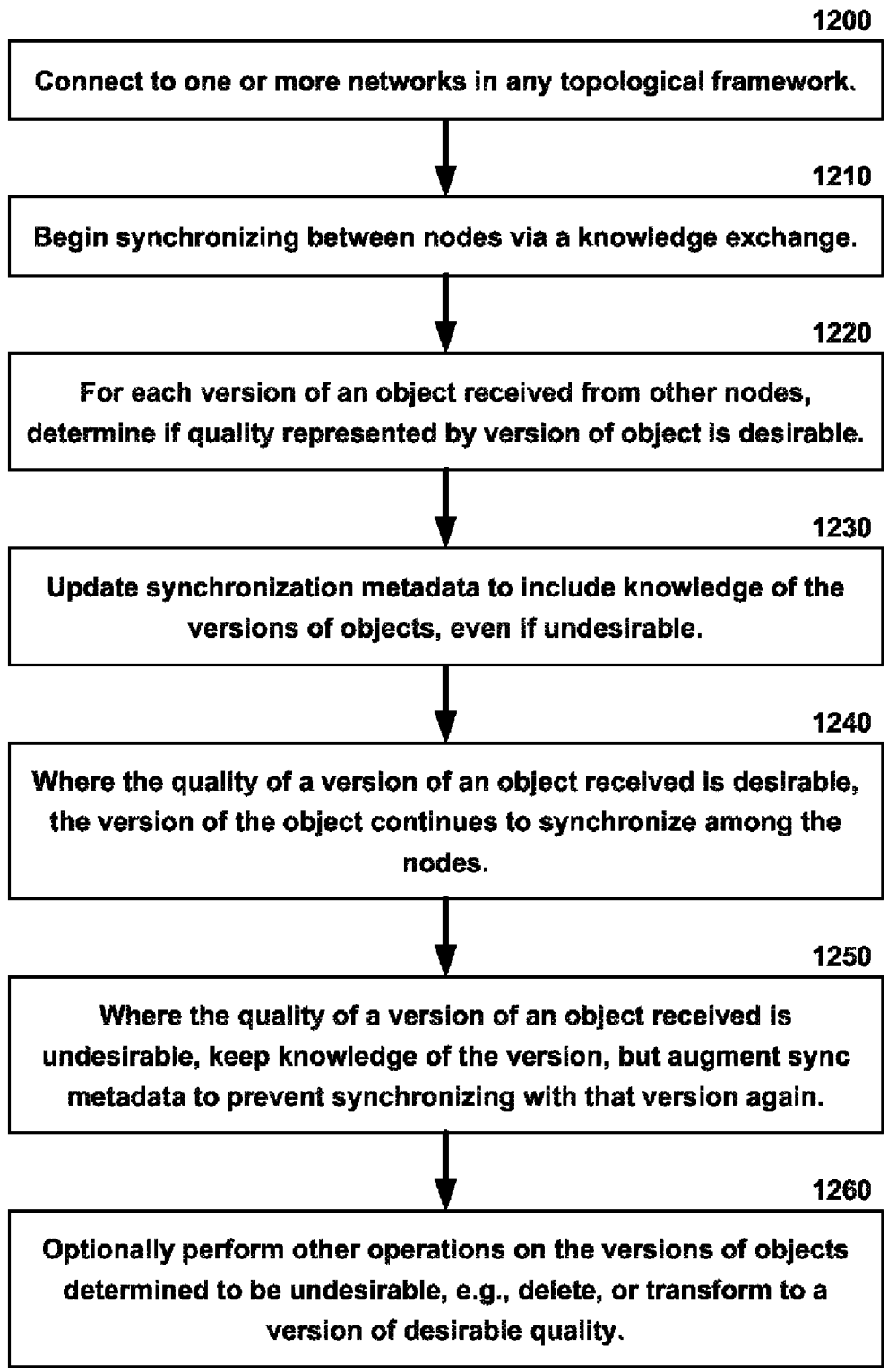
FIG. 12 is a general flow diagrams illustrating a first embodiment for incorporating qualitative information into synchronization metadata.

Tombstoning embodiments are generally illustrated by the flow diagram of FIG. 12. At 1200, various nodes may connect to one another according to any topological framework in a diverse multi-master synchronization environment. At 1210, two or more nodes begin synchronizing via a knowledge exchange. At 220, for each version of an object received from other nodes, each node determines if the quality represented by the version of the object is desirable for the node. The synchronization metadata is updated at 1230 to include knowledge of the versions encountered, whether desirable or not. At 1240, if the version is desirable, the version continues to synchronize, i.e., synchronization with respect to the version of the object continues unchanged in future knowledge exchanges. At 1250, if the node determines the object is not desirable, while the knowledge of the version is maintained (to prevent the object from being synchronized to the node in future knowledge exchanges), at 1260, the undesirable version of the object can be deleted, or other actions, such as conversion, can take place on the version of the object.

Figure 13:
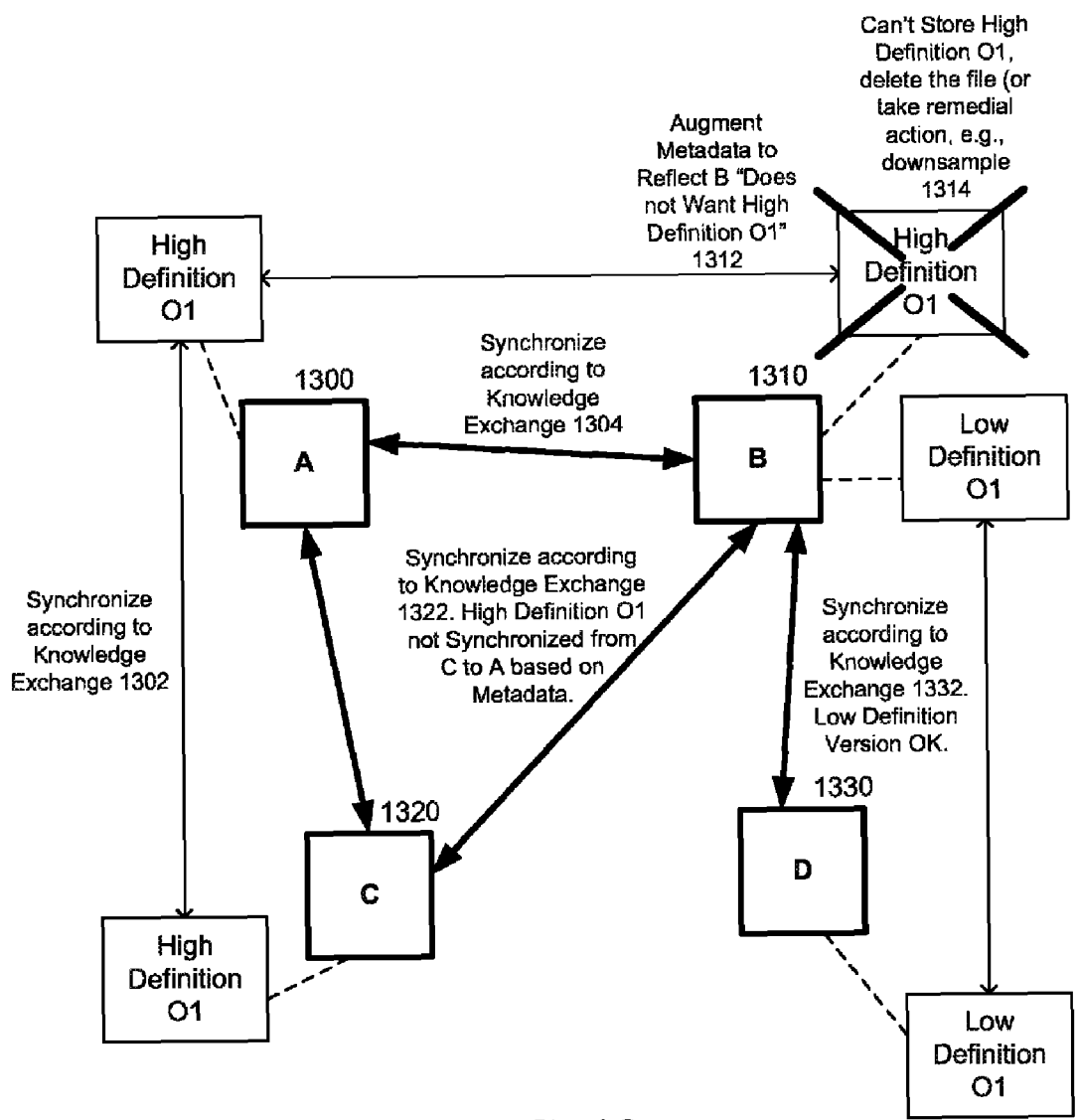
FIG. 13 illustrates a first non-limiting scenario in which a tombstoning embodiment is demonstrated in exemplary fashion.

Operation of the tombstone embodiment is generally illustrated in FIG. 13. As shown, initially a node A 1300 and a node C 1320 synchronize at 1302 and synchronize a high definition object O1 that both nodes support. However, at 1304, when the node A 100 and node B 1310 synchronize, node B 1310 determines that it cannot store the high definition version of the object at 1314, and so the object is deleted or transformed to a lower definition version. In the example, for simplicity, the object is deleted by node B 1310. At 1312, node B augments its synchronization knowledge to reflect that node B 1310 does not wish to synchronize with that version of the object again.

Advantageously, then when node C 1320 synchronizes with node B 1310 at 1322, the high definition object O1 will not be synchronized since node B 1310 has knowledge that reflects the undesirability of that version. However, when later node D 1330 synchronizes with node B 1310 at 1332, node D 1330 synchronizes the low definition version of the object O1 to node B 1310 since there is no exception on the low definition version. In this fashion, each node can reflect its dislikes for various versions of data of different quality over time, and synchronize more intelligently, without duplication of effort for unsupported items creating unnecessary synchronization traffic.

In an alternative set of embodiments, quality is represented in synchronization metadata by versioning versions of data, where it is determined that a version of data has undergone a quality transformation, as opposed to, a destructive change meriting a new independent version. In addition to versioning versions for representing one layer of transforms or quality levels that are applied to a version of an object, such embodiments can also be extended to any number of levels or layers, e.g., versioning versions of versions for two layers, versioning versions of versions of versions for three layers, and so on.

Advantageously, individual endpoints are allowed to decide whether a particular change to an object represents a typical change, i.e., such that a new version is created, e.g., an increment to the tickcount, which does not trigger the versioning of versions, or represents instead a fidelity or transform change of the type that is represented by versioning the current version of the object, e.g., versioning the version of the object represented by the current tickcount. Enhancing knowledge by including versioning of version information in a knowledge representation is thus another way to accomplish the objective of conveying qualitative information about transformations to objects.

Figure 14:
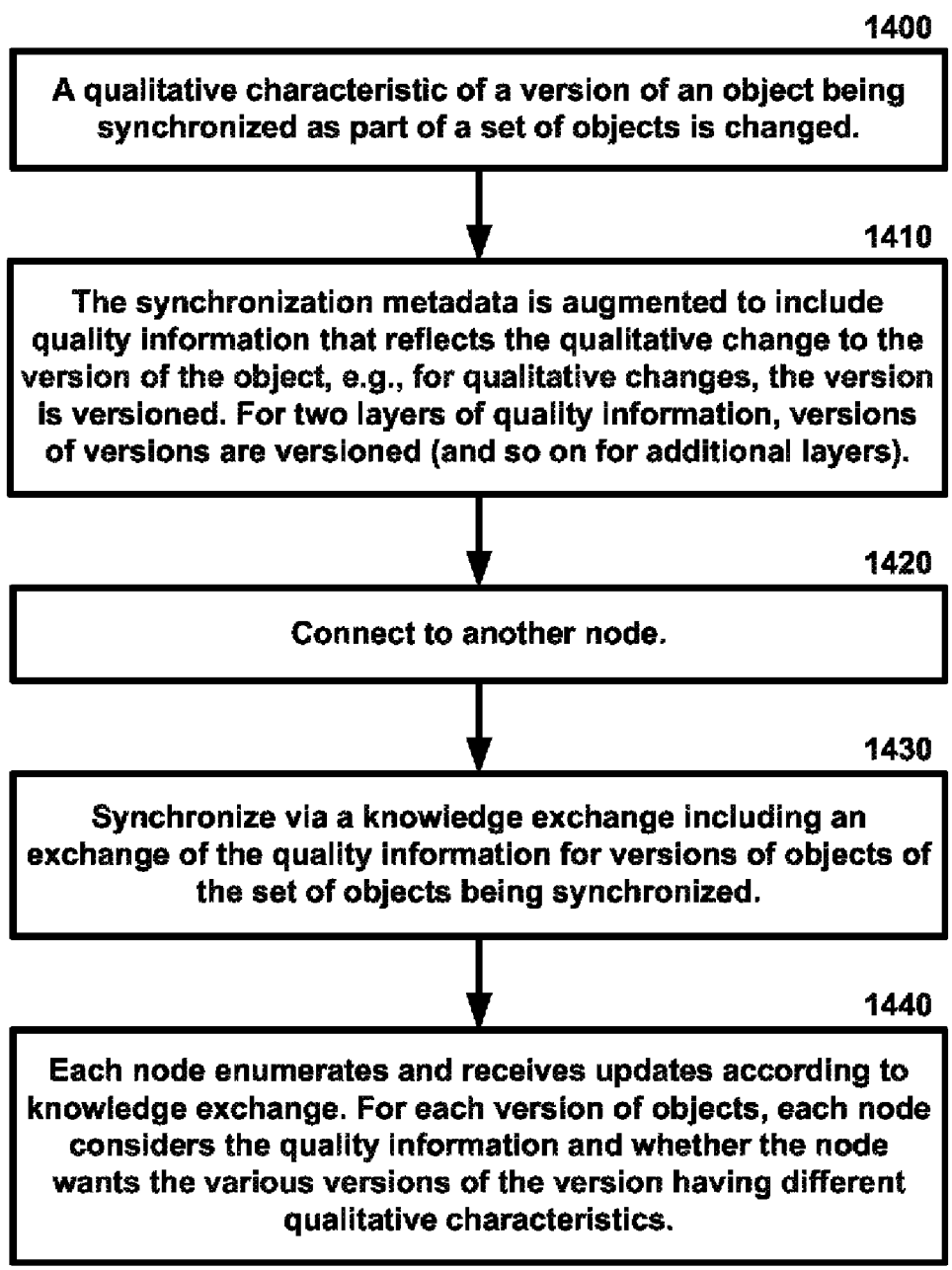
FIG. 14 is a general flow diagrams illustrating an alternate embodiment for incorporating qualitative information into synchronization metadata.

Exemplary embodiments for versioning version information are illustrated in the flow diagram of FIG. 14. At 1400, a qualitative characteristic of a version of an object being synchronized as part of a set of objects is changed. At 1410, the synchronization metadata is augmented to include quality information that reflects the qualitative change to the version of the object, e.g., for qualitative changes, the version is versioned. For two layers of quality information, versions of versions are versioned, and so on for additional layers. At 1420, the node connects to another node in the multimaster synchronization environment.

At 1430, the nodes synchronize via a knowledge exchange including an exchange of the quality version information for versions of objects of the set of objects being synchronized. Then, at 1440, each node enumerates and receives updates according to knowledge exchange. Then, for each version of objects, each node considers the quality information and whether the node wants the various versions of the version having different qualitative characteristics.

Figure 15:
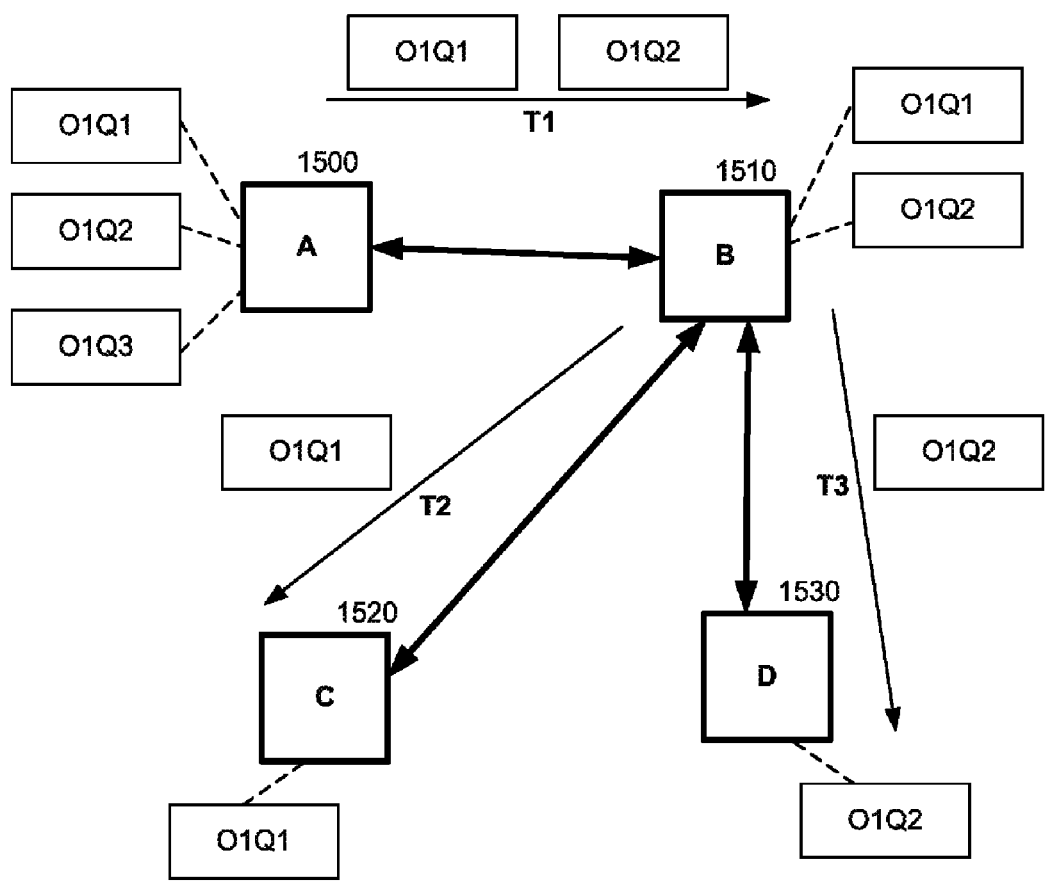
FIG. 15 is a second non-limiting scenario in which a versioning of versions embodiment is demonstrated in exemplary fashion.

The efficiency of representing different versions of a version of an object to correspond to different qualitative versions of the same object is further illustrated in the block diagram of FIG. 15. In FIG. 15, initially a node A 1500 has three different qualitative versions of the same version of an object O. As shown, O1Q1 is notation that describes metadata representing the first version of object O and Q1 indicates that it is a first quality version of the version of the object O1. Thus, node A 1500 includes three different qualitative versions Q1, Q2, Q3 of the object O1. Then, at T1, after a knowledge exchange between node A 1500 and node B 1510 at T1, node B 1510 specifies it wants only versions Q1 and Q2, which are then synchronized. Then in further synchronizations at T2 and T3, object C 1520 only desires the version with quality Q1 whereas object D 1530 only desires the version with quality Q2. The representation of the different qualities thus gives each device a chance to decide what versions to synchronize in the multi-master synchronization environment to avoid a lot of unnecessary and wasteful synchronization of objects.

Figure 16:
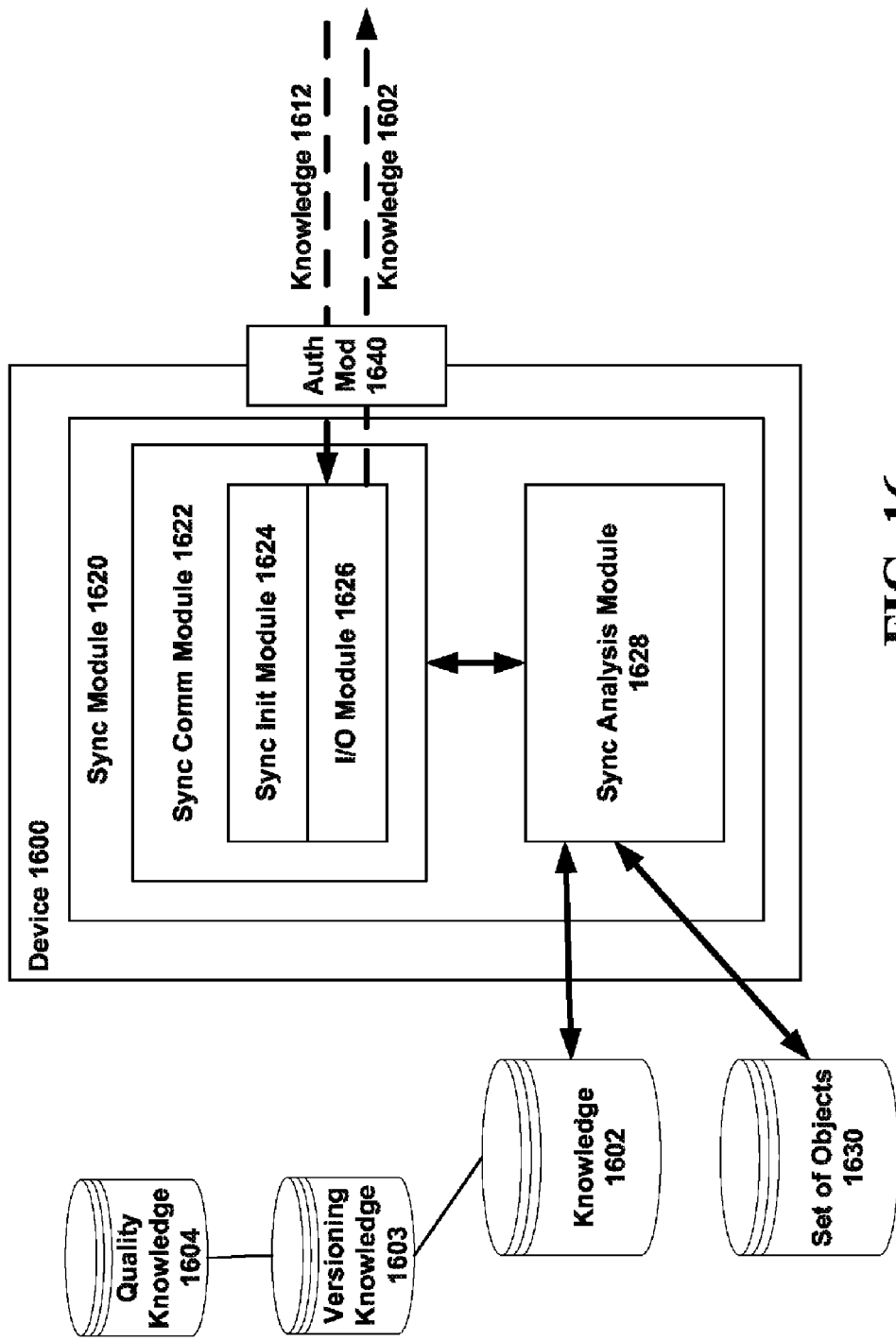
FIG. 16 is a block diagram of an exemplary non-limiting implementation of a device for performing a knowledge exchange with another node via a common set of APIs that can communicate quality information as part of synchronization metadata.

FIG. 16 is a block diagram of an exemplary non-limiting implementation of a device 1600 for performing a full or partial knowledge exchange via a set of APIs. As shown, device 1600 includes a sync module 1620 that performs knowledge exchange techniques for synchronizing a set of objects 1630 with another device in accordance with non-limiting embodiments. The set of objects 1630 can also be stored in a cache (not shown) for efficient operations, and then set of objects 1630 can be later updated by offline applications. Sync module 1620 may include a sync communications module 1622 for generally transmitting and receiving data in accordance with knowledge exchange techniques to and from other nodes as described herein.

Sync communications module 1622 may also include a sync initiation module 1624 which may initiate synchronization with a second device if authorized, e.g., via optional authorization module 1640, and connect to the second device. Sync module 1622 may also include an I/O module 1626 responsive to the initiation of synchronization by sending full and/or partial knowledge 1602 about the set of objects 1630 to a second device via APIs, e.g., for getting or sending knowledge or for getting or sending changes. Similarly, I/O module 1626 can receive requested knowledge or changes 1612 of the second device and changes to be made to the set of objects 1630 originating from the second device. In turn, a sync analysis module 1628 operates to apply any changes to be made to the set of objects 1630 and to compare knowledge 1612 received from the second device with the knowledge 1602 of the first device in order to determine changes to be made locally or to send to the second device to complete synchronization between the devices.

In accordance with embodiments herein, knowledge 1602 possessed by a node of a set of objects 1630, such as versioning knowledge 1603 as described in connection with FIGS. 5 to 11, is augmented to include quality knowledge 1604, which defines qualitative information about a transform applied to the objects in the knowledge based framework.

As mentioned, various embodiments of knowledge based quality of versions of objects are provided herein by augmenting metadata included in a knowledge framework, an overview of which was provided above. For the avoidance of doubt, the term "quality" as used herein is meant broadly, and refers to any way in which data can be transformed according to one or more transforms or functions that impact a qualitative characteristic with respect to the data. Thus, the term quality is often context or application specific. In this respect, by including the notion of different qualitative versions of objects in synchronization metadata exchanged as part of a knowledge exchange as described above, each endpoint can decide what to do with the different versions when it comes to synchronizing in a computing system.

Similarly, the term "transform" and the term "transcoding" refers to any function for changing the data. In addition, the terms change of "resolution" or "fidelity" refers broadly to changing any object to include more or less detail. Various embodiments provide synchronization among a plurality of network nodes in a multi-master synchronization environment are described herein that extend a knowledge based synchronization framework to include notions of qualitative transforms of synchronized object(s).

Thus, the enhanced metadata representation of the various embodiments enables endpoints to efficiently learn and convey knowledge regarding objects including whether changes applied to the objects transform the objects in a qualitative manner so that a node can decide whether different qualitative versions of the same version of an object are desirable to synchronize to the node from other nodes. Then, knowledge exchanges can include an analysis of which qualities of a version of an object are most desirable to the nodes involved, and prevent unnecessary repeating of sending undesirable quality versions of the object to other nodes that do not want to receive those quality versions of the object.

Exemplary Networked and Distributed Environments

One of ordinary skill in the art can appreciate that the various embodiments of the synchronization infrastructure described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may use the synchronization infrastructure as described for various embodiments of the subject disclosure.

Figure 17:
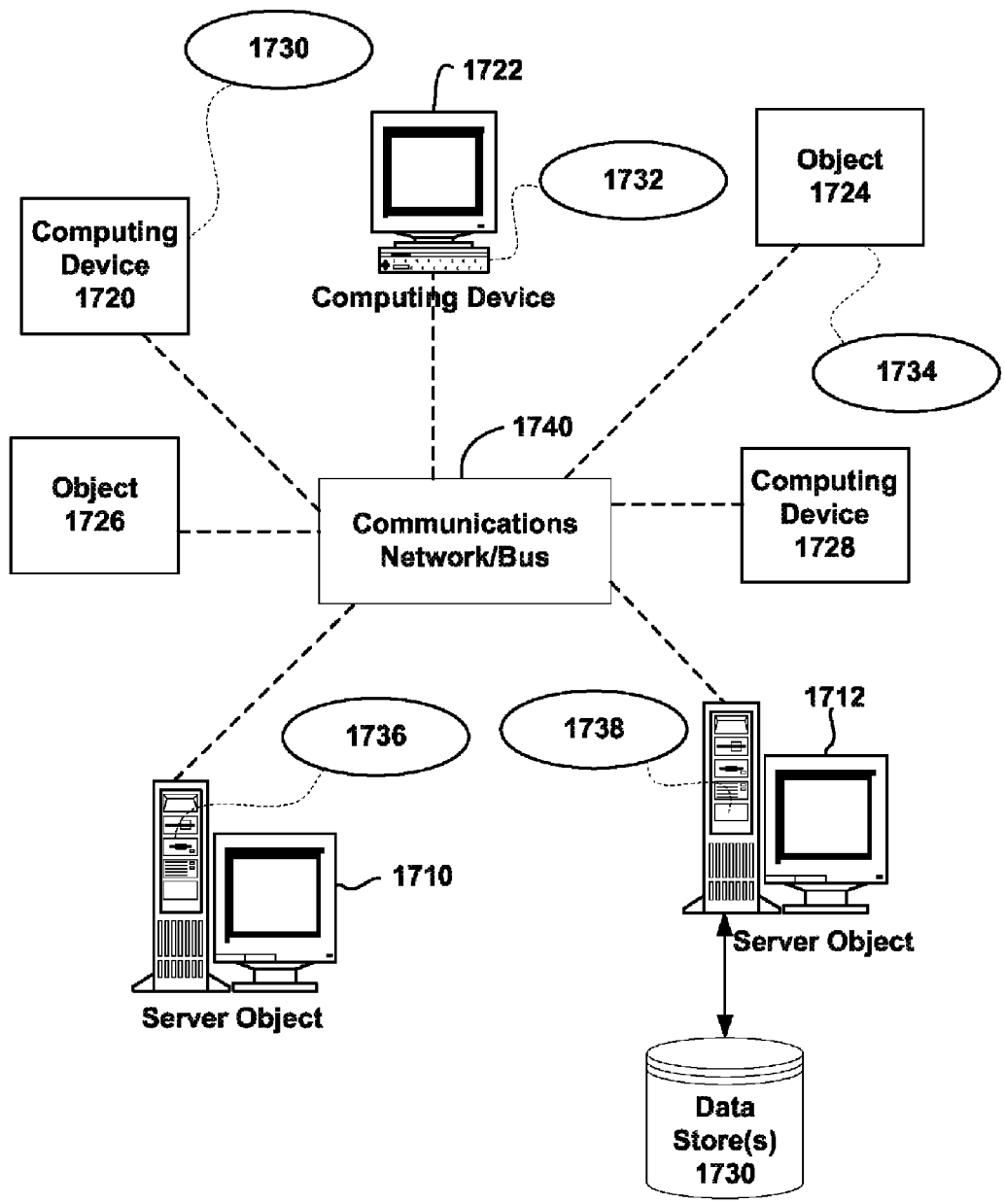
FIG. 17 is a block diagram representing exemplary non-limiting networked environments in which various embodiments described herein can be implemented.

FIG. 17 provides a schematic diagram of an exemplary networked or distributed computing environment. The distributed computing environment comprises computing objects 1710, 1712, etc. and computing objects or devices 1720, 1722, 1724, 1726, 1728, etc., which may include programs, methods, data stores, programmable logic, etc., as represented by applications 1730, 1732, 1734, 1736, 1738. It can be appreciated that objects 1710, 1712, etc. and computing objects or devices 1720, 1722, 1724, 1726, 1728, etc. may comprise different devices, such as PDAs, audio/video devices, mobile phones, MP3 players, personal computers, laptops, etc.

Each object 1710, 1712, etc. and computing objects or devices 1720, 1722, 1724, 1726, 1728, etc. can communicate with one or more other objects 1710, 1712, etc. and computing objects or devices 1720, 1722, 1724, 1726, 1728, etc. by way of the communications network 1740, either directly or indirectly. Even though illustrated as a single element in FIG. 17, network 1740 may comprise other computing objects and computing devices that provide services to the system of FIG. 17, and/or may represent multiple interconnected networks, which are not shown. Each object 1710, 1712, etc. or 1720, 1722, 1724, 1726, 1728, etc. can also contain an application, such as applications 1730, 1732, 1734, 1736, 1738, that might make use of an API, or other object, software, firmware and/or hardware, suitable for communication with or implementation of the synchronization infrastructure provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the synchronization infrastructure as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 17, as a non-limiting example, computers 1720, 1722, 1724, 1726, 1728, etc. can be thought of as clients and computers 1710, 1712, etc. can be thought of as servers where servers 1710, 1712, etc. provide data services, such as receiving data from client computers 1720, 1722, 1724, 1726, 1728, etc., storing of data, processing of data, transmitting data to client computers 1720, 1722, 1724, 1726, 1728, etc., although any computer can be considered a client, a server, or both, depending on the circumstances. Any of these computing devices may be processing data, synchronizing or requesting services or tasks that may implicate the synchronization infrastructure as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the synchronization infrastructure can be provided standalone, or distributed across multiple computing devices or objects.

In a network environment in which the communications network/bus 1740 is the Internet, for example, the servers 1710, 1712, etc. can be Web servers with which the clients 1720, 1722, 1724, 1726, 1728, etc. communicate via any of a number of known protocols, such as the hypertext transfer protocol (HTTP). Servers 1710, 1712, etc. may also serve as clients 1720, 1722, 1724, 1726, 1728, etc., as may be characteristic of a distributed computing environment.

Exemplary Computing Device

As mentioned, advantageously, the techniques described herein can be applied to any device where it is desirable to synchronize with other objects in a computing system. It should be understood, therefore, that handheld, portable and other computing devices and computing objects of all kinds are contemplated for use in connection with the various embodiments, i.e., anywhere that a device may synchronize. Accordingly, the below general purpose remote computer described below in FIG. 18 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 18:
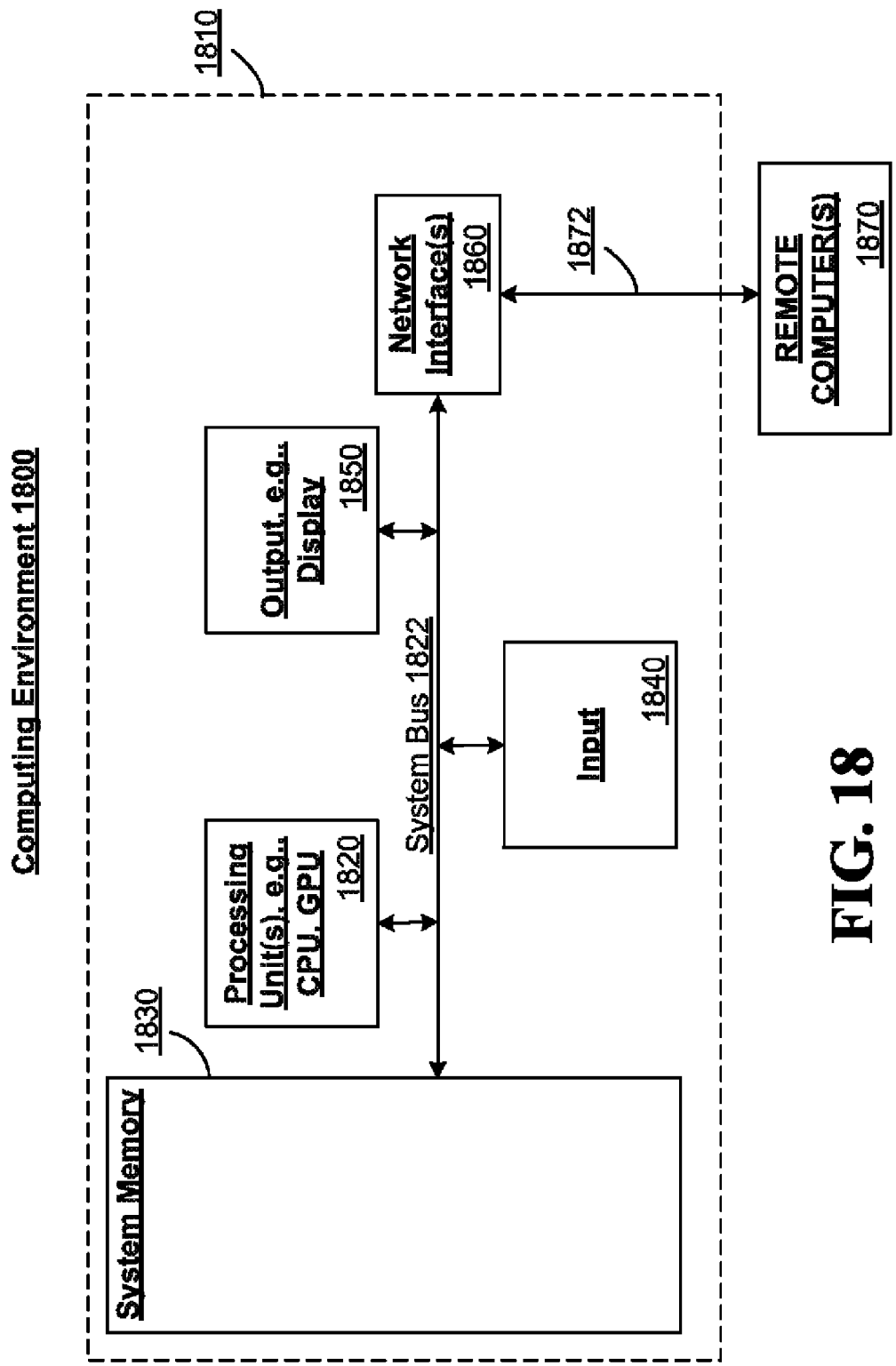
FIG. 18 is a block diagram representing an exemplary non-limiting computing system or operating environment in which one or more aspects of various embodiments described herein can be implemented.

FIG. 18 thus illustrates an example of a suitable computing system environment 1800 in which one or aspects of the embodiments described herein can be implemented, although as made clear above, the computing system environment 1800 is only one example of a suitable computing environment and is not intended to suggest any limitation as to scope of use or functionality. Neither should the computing environment 1800 be interpreted as having any dependency or requirement relating to any one or combination of components illustrated in the exemplary operating environment 1800.

With reference to FIG. 18, an exemplary remote device for implementing one or more embodiments includes a general purpose computing device in the form of a computer 1810. Components of computer 1810 may include, but are not limited to, a processing unit 1820, a system memory 1830, and a system bus 1822 that couples various system components including the system memory to the processing unit 1820.

Computer 1810 typically includes a variety of computer readable media and can be any available media that can be accessed by computer 1810. The system memory 1830 may include computer storage media in the form of volatile and/or nonvolatile memory such as read only memory (ROM) and/or random access memory (RAM). By way of example, and not limitation, memory 1830 may also include an operating system, application programs, other program modules, and program data.

A user can enter commands and information into the computer 1810 through input devices 1840. A monitor or other type of display device is also connected to the system bus 1822 via an interface, such as output interface 1850. In addition to a monitor, computers can also include other peripheral output devices such as speakers and a printer, which may be connected through output interface 1850.

The computer 1810 may operate in a networked or distributed environment using logical connections to one or more other remote computers, such as remote computer 1870. The remote computer 1870 may be a personal computer, a server, a router, a network PC, a peer device or other common network node, or any other remote media consumption or transmission device, and may include any or all of the elements described above relative to the computer 1810. The logical connections depicted in FIG. 18 include a network 1872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to synchronize.

Also, there are multiple ways to implement the same or similar functionality, e.g., an appropriate API, tool kit, driver code, operating system, control, standalone or downloadable software object, etc. which enables applications and services to use the synchronization infrastructure. Thus, embodiments herein are contemplated from the standpoint of an API (or other software object), as well as from a software or hardware object that provides synchronization capabilities. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The term "limited quality" shall refer to a restriction on existence of an object in a synchronizing system such that the start and/or end of existence of the object is restricted.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment or set of embodiments, but rather should be construed in breadth, spirit and scope in accordance with the appended claims.

What is claimed is:

1. A method for synchronizing a set of objects between a first node and a second node of a plurality of nodes communicatively coupled via one or more networks in a multi-master synchronization environment, comprising:

for a given data scope, exchanging synchronization knowledge between the first node and the second node for a set of objects being represented on both nodes, wherein synchronization knowledge of the first node and the second node includes synchronization metadata representing corresponding versions for the objects of the set of objects represented on the first node and second node, respectively, and wherein representation of the synchronization knowledge is independent of data type;

ascertaining whether an object underwent a change to a desired qualitative feature based on the synchronization knowledge exchange, wherein the desired qualitative feature is an incremental quality identified from a plurality of potential qualitative features associated with the object, and wherein the object is receivable by the first node or the second node whichever is a receiving node; and updating the synchronization metadata of the receiving node to include transform metadata that indicates a first knowledge by the receiving node of a first version of the object with a first transform applied and a second knowledge of a second version of the object with a second transform applied;

wherein the updating comprises comparing the synchronization knowledge of the first node and the second node to determine a collective knowledge of quality information for the set of objects; and wherein the updating further comprises selecting the object as an object to synchronize based on the collective knowledge.

2. The method of claim 1, further including:
  determining, based on at least one predefined criterion, whether the object to which the first transform is applied is desirable to the receiving node, wherein the determining includes comparing the first transform with the second transform.

3. The method of claim 2, further including:
  if the object to which the first transform is applied is not desirable to the receiving node, deleting the object by the receiving node.

4. The method of claim 3, further including:
  if the object to which the first transform is applied is not desirable to the receiving node, further comprising tombstoning the object by updating the synchronization metadata of the receiving node to reflect that the receiving node has learned of the version of the object with the first transform applied, but does not desire to receive the version as part of future knowledge exchanges with other nodes in the multi-master synchronization environment.

5. The method of claim 1, further including:
  wherein the updating of the synchronization metadata further includes augmenting the synchronization metadata with transform metadata that indicates knowledge of a difference between the first transform and the second transform for a same object.

6. The method of claim 1, further including:
  wherein the updating of the synchronization metadata further includes augmenting the synchronization metadata with transform metadata that indicates knowledge of objects of differing first and second transforms and that the receiving node has deleted the object to which the first transform is applicable or deleted the object to which the second transform is applicable.

7. The method of claim 6, wherein the updating of the synchronization metadata comprises preventing future knowledge exchanges in which the receiving node would receive the deleted object again from the same or other nodes, at least in part by maintaining synchronization metadata describing the action of deleting the object, and by defining a rule that rejects synchronization relative to a future object having a same qualitative feature as the deleted object.

8. The method of claim 6, further including:
  wherein the augmenting of the synchronization metadata includes augmenting the synchronization metadata for the object with a Boolean value that indicates that the receiving node has deleted the object to which the first transform is applicable or deleted the object to which the second transform is applicable.

9. The method of claim 1, wherein the exchanging includes comparing, within the data scope, local synchronization knowledge of the first node concerning the set of objects represented on the first node with the external synchronization knowledge of the second node including taking into account any objects that have been learned by the first node or second node as part of the local synchronization knowledge or the external synchronization knowledge, but have been deleted on the first node or the second node, respectively.

10. The method of claim 9, further comprising:
  determining changes to the external knowledge of the set of objects represented on the second node and corresponding changes to the set of objects represented on the second node based on the comparing; and
  transmitting the changes to the external knowledge and the corresponding changes to the set of objects to the second node.

11. A node device of a plurality of nodes connectable via one or more networks that synchronizes a set of objects between the node and an other node of the plurality of nodes in a multi-master synchronization environment, comprising:
  a synchronization component coupled to a processor and configured to synchronize the set of objects between the node and the other node of the plurality of nodes, including:
    a synchronization communications component configured to initiate a synchronization with the other node via a synchronization protocol that defines, independent of data type, metadata structure for a knowledge exchange between the other node and the node, wherein the synchronization communications component is further configured to transmit to the other node a request to synchronize with the set of objects based on the synchronization protocol, and wherein the synchronization communications component is further configured to receive external knowledge of the set of objects from the other node in response to the request including other node object first versioning information corresponding to the set of objects represented on the other node and other node object second versioning information corresponding to the other node object first versioning information, wherein the other node object second versioning information versions the other node object first versioning information and represents different fidelity levels for versions of the set of objects represented by the other node object first versioning information; and
    a synchronization analysis component configured to ascertain whether an object underwent a change to a desired qualitative feature in the other node based on the external knowledge of the set of objects, wherein the desired qualitative feature is an incremental quality identified from a plurality of potential qualitative features associated with the object, the synchronization analysis component further configured to update local knowledge of the set of objects represented on the node and corresponding node object versioning information based on whether the external knowledge of the set of objects includes the change to the desired qualitative feature associated with the object;
  wherein the synchronization component is configured to compare synchronization data of the node and the other node to determine a collective knowledge of quality information for the set of objects; and
  wherein the synchronization component is further configured to select the object as an object to synchronize based on the collective knowledge.

12. The node device of claim 11, wherein, for each object of the set of objects represented by an updated local knowledge having corresponding node object first versioning information and corresponding node object second versioning information, wherein the synchronization analysis component is configured to determine, by comparing second versioning information represented on the node and the other node for a given first version of the object represented by the first versioning information, whether a given second version of the given first version represented by the second versioning information is desirable to synchronize to either the node or the other node.

13. The node device of claim 11, wherein the synchronization protocol does not prescribe any schema of the actual data being synchronized between the node and the other node.

14. A method for synchronizing a set of objects between a first node and a second node of a plurality of nodes communicatively coupled via one or more networks in a multi-master synchronization environment, comprising:

changing a qualitative characteristic of at least one object of the set of objects by the first node;

updating synchronization knowledge metadata of the first node concerning the at least one object to include quality metadata indicating the change to the qualitative characteristic, wherein representation of the synchronization knowledge metadata is independent of data type;

ascertaining whether the at least one object underwent a change to a desired qualitative characteristic preferred by the second node, wherein the desired qualitative characteristic is an incremental quality identified from a plurality of potential qualitative features associated with the at least one object; and synchronizing with the second node by the first node including transmitting, by the first node to the second node, an updated synchronization knowledge metadata of the first node, wherein the transmitting includes transmitting version metadata for objects of the set of objects corresponding to versions of the set of objects represented on the first node and any corresponding quality metadata associated with the versions of the set of objects;

wherein the synchronizing comprises comparing synchronization data of the first node and the second node to determine a collective knowledge of quality information for the set of objects; and wherein the synchronizing further comprises selecting the at least one object as an object to synchronize based on the collective knowledge.

15. The method of claim 14, further including:
wherein the updating includes updating in response to the changing of the qualitative characteristic of the at least one object.

16. The method of claim 14, further including:
determining whether the changing changed the qualitative characteristic of the at least one object based on at least one criterion defined by the first node.

17. The method of claim 16, wherein the determining includes determining whether the changing transformed data represented by the at least one object without causing a destruction of the data.

18. The method of claim 16, wherein the determining includes determining whether the changing transformed data represented by the at least one object without causing a change in a fidelity of the data.

19. The method of claim 18, wherein the determining includes determining whether the changing transformed the data represented by the at least one object while degrading the fidelity of the data.

20. The method of claim 18, wherein the determining includes determining whether the changing transformed the data represented by the at least one object while enhancing the fidelity of the data.

21. The method of claim 16, wherein the updating of the synchronization knowledge metadata of the first node to indicate the change to the qualitative characteristic includes leaving the current version metadata for the at least one object unchanged and storing, with the current version metadata, additional quality version metadata that differentiates different qualities for the same versions of the at least one object.

* * * * *